United States Patent
Sekimoto

(10) Patent No.: US 11,474,017 B2
(45) Date of Patent: Oct. 18, 2022

(54) MICROBIAL PARTICLE MEASURING APPARATUS AND MICROBIAL PARTICLE MEASURING METHOD

(71) Applicant: RION Co., Ltd., Tokyo (JP)

(72) Inventor: Kazuma Sekimoto, Tokyo (JP)

(73) Assignee: RION Co., Ltd., Tokyo (JP)

( * ) Notice: Subject to any disclaimer, the term of this patent is extended or adjusted under 35 U.S.C. 154(b) by 258 days.

(21) Appl. No.: 17/003,470

(22) Filed: Aug. 26, 2020

(65) Prior Publication Data
US 2021/0063297 A1 Mar. 4, 2021

(30) Foreign Application Priority Data

Aug. 29, 2019 (JP) .............................. JP2019-157307

(51) Int. Cl.
*G01N 21/64* (2006.01)
*G01N 15/06* (2006.01)

(52) U.S. Cl.
CPC ......... *G01N 15/06* (2013.01); *G01N 21/6408* (2013.01); *G01N 21/6486* (2013.01); *G01N 2015/0693* (2013.01)

(58) Field of Classification Search
CPC ........... G01N 15/06; G01N 2015/0693; G01N 21/6408; G01N 21/6486
See application file for complete search history.

(56) References Cited

U.S. PATENT DOCUMENTS
2006/0237665 A1 10/2006 Barney et al.

FOREIGN PATENT DOCUMENTS
JP 2011-83214 A 4/2011

*Primary Examiner* — Mark R Gaworecki
(74) *Attorney, Agent, or Firm* — Rankin, Hill & Clark LLP

(57) ABSTRACT

A microbial particle measuring apparatus includes: a light emitter configured to irradiate a fluid with light of a predetermined wavelength over a predetermined measurement time; a fluorescence receiver configured to selectively receive fluorescence emitted from particles contained in the fluid and output a signal having a magnitude corresponding to intensity of the fluorescence; a signal acquisition unit configured to obtain the signal output from the fluorescence receiver at regular intervals over the measurement time; and a determiner configured to calculate a slope of waveform of the signal obtained by the signal acquisition unit, and determine a concentration of microbial particles contained in the fluid using an attenuation amount of fluorescence intensity generated in a time period in which the slope in the measurement time is smaller than a predetermined value as an amount of attenuation derived from the microbial particles.

11 Claims, 14 Drawing Sheets

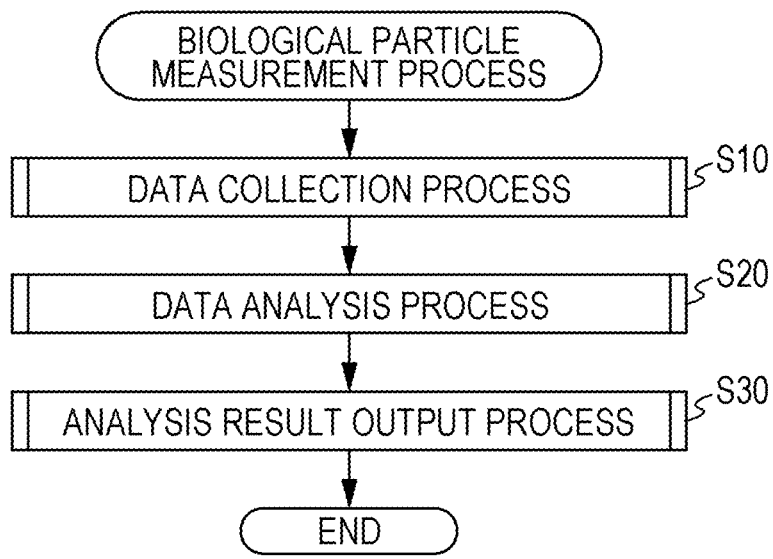
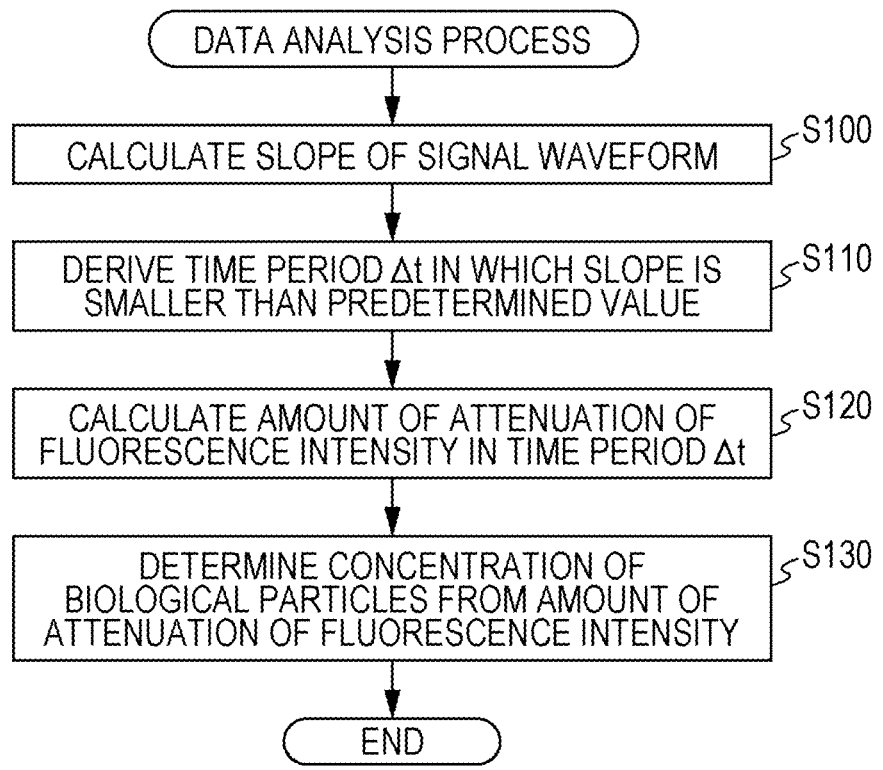

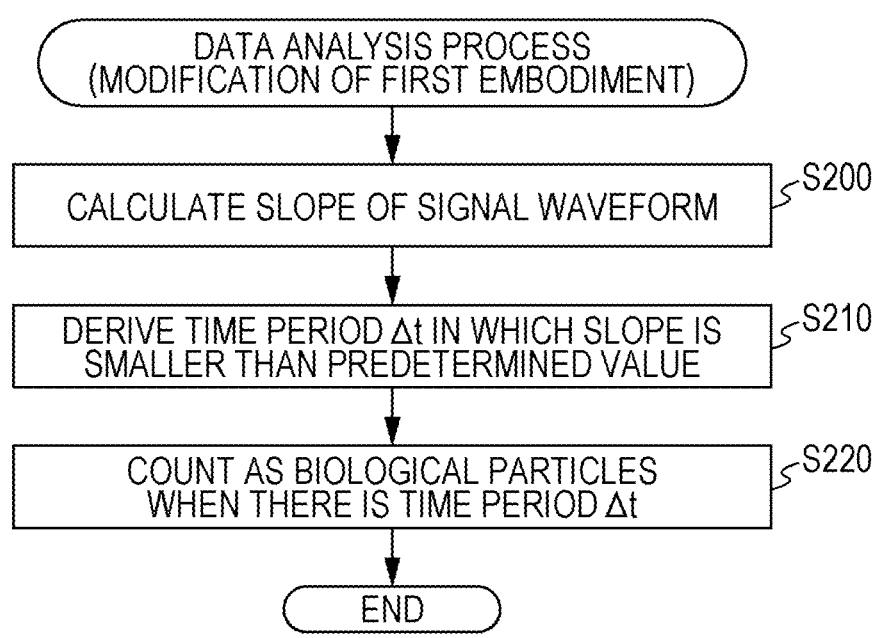

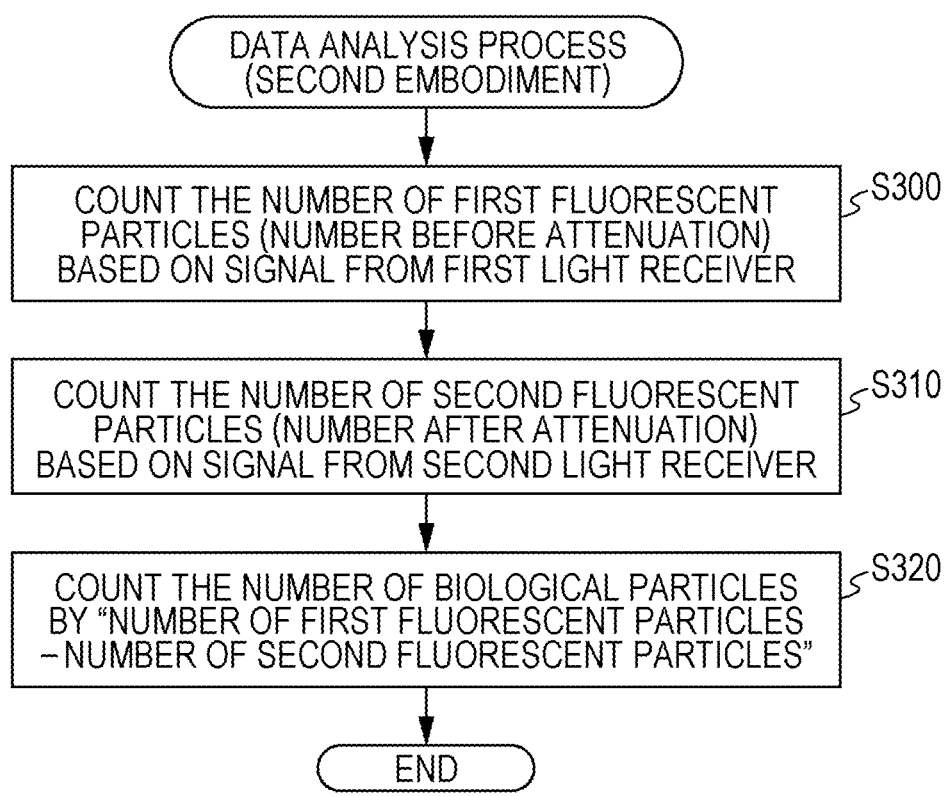

MICROBIAL PARTICLE MEASURING APPARATUS AND MICROBIAL PARTICLE MEASURING METHOD

CROSS-REFERENCE TO RELATED APPLICATION

This application claims priority from Japanese Patent Application No. 2019-157307 filed with the Japan Patent Office on Aug. 29, 2019, the entire content of which is hereby incorporated by reference.

BACKGROUND

1. Technical Field

One aspect of the present disclosure relates to a microbial particle measuring apparatus and a microbial particle measuring method, for measuring concentration and number of particles derived from organisms (hereinafter referred to as "microbial particles") contained in a sample fluid.

2. Background Art

Typically, various methods have been proposed for detecting microbial particles present in a gas or a liquid in real time. For example, in JP-A-2011-083214, a microorganism detection apparatus is disclosed as a technique focusing on the fact that when the particles floating in the air are irradiated with blue light, dust of chemical fibers and the like emits fluorescence in addition to microbial particles, and fading of fluorescence occurs faster in the microbial particles than in the dust and the like. In the microorganism detection apparatus, the blue light is continuously radiated for a predetermined time until the fluorescence of the microbial particles almost completely fades. Then, a difference between fluorescence intensity of the blue light immediately after irradiation and fluorescence intensity of the blue light after elapse of a predetermined time from irradiation start is measured to obtain an amount of the microbial particles. Based on this result, the concentration of the microbial particles is calculated.

SUMMARY

A microbial particle measuring apparatus includes: a light emitter configured to irradiate a fluid with light of a predetermined wavelength over a predetermined measurement time; a fluorescence receiver configured to selectively receive fluorescence emitted from particles contained in the fluid and output a signal having a magnitude corresponding to intensity of the fluorescence; a signal acquisition unit configured to obtain the signal output from the fluorescence receiver at regular intervals over the measurement time; and a determiner configured to calculate a slope of waveform of the signal obtained by the signal acquisition unit, and determine a concentration of microbial particles contained in the fluid using an attenuation amount of fluorescence intensity generated in a time period in which the slope in the measurement time is smaller than a predetermined value as an amount of attenuation derived from the microbial particles.

BRIEF DESCRIPTION OF DRAWINGS

FIG. 4 is a flowchart illustrating a procedure example of a microbial particle measurement processing in the first embodiment;

FIG. 5 is a flowchart illustrating a procedure example of a data analysis process in the first embodiment;

FIG. 12 is a flowchart illustrating a procedure example of the data analysis process in the modification of the first embodiment;

FIG. 15 is a flowchart illustrating a procedure example of a data analysis process in the second embodiment.

DETAILED DESCRIPTION

Figure 1:
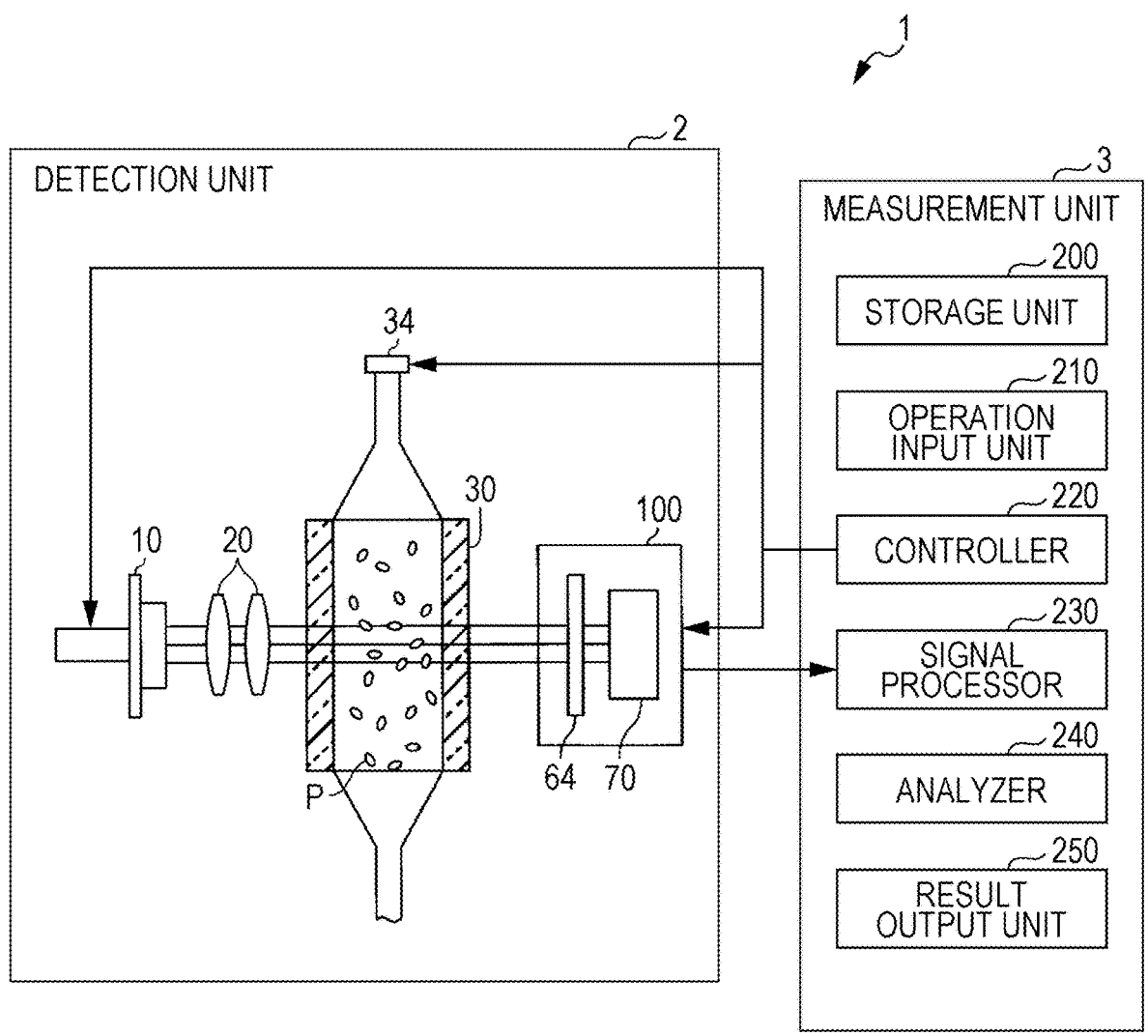
FIG. 1 is a schematic structure diagram of a microbial particle measuring apparatus according to a first embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the above-described related art, blue light is continuously irradiated in minutes for a predetermined time until fluorescence of microbial particles almost completely fades. Therefore, in the predetermined time, even with respect to dust and the like, fading of the fluorescence progresses although its rate is slower than that of the microbial particles. Therefore, an attenuation amount of the blue light obtained by a difference between fluorescence intensity of the blue light immediately after irradiation and fluorescence intensity of the blue light after elapse of the predetermined time from irradiation start includes an amount of attenuation derived from the dust and the like. Accordingly, concentration calculated based on the amount of attenuation includes the concentration derived from the dust and the like. In this way, in the above-described related art, it is difficult to avoid influence of non-microbial particles in calculating the concentration of the microbial particles.

Therefore, one object of the present disclosure is to provide a technique for accurately measuring the concentration of the microbial particles.

In one aspect of the present disclosure, the following microbial particle measuring apparatus and microbial particle measuring method are employed. It should be noted that the following wording in parentheses is merely an example, and the technique of the present disclosure is not limited to this.

That is, in the microbial particle measuring apparatus and the microbial particle measuring method of the present disclosure, the fluid is irradiated with light of a predetermined wavelength over a predetermined measurement time. Further, during the measurement time, the fluorescence emitted from the particles contained in the fluid is selectively received, and a signal output with a magnitude corresponding to intensity of the fluorescence is obtained at regular intervals. After that, a slope of waveform of the signal obtained is calculated, and the concentration of the microbial particles contained in the fluid is determined using an attenuation amount of fluorescence intensity generated in a time period in which the slope in the measurement time is smaller than a predetermined value as an amount of attenuation derived from the microbial particles.

From results of experiments, it is known that an attenuation rate of the fluorescence intensity emitted from the particles when irradiated with the light of the predetermined wavelength varies depending on what a fluorescent substance contained in the particles is derived from. In this aspect, a specific substance (for example, tryptophan and tyrosine) contained in the microbial particles is used as an index. In addition, the microbial particles contained in the fluid are captured as a particle group. The concentration of the microbial particles is determined using the attenuation of fluorescence intensity in the time period in which the slope of the waveform of the signal sampled is smaller than the predetermined value as the attenuation derived from the specific substance, that is, the attenuation derived from the microbial particles. Therefore, according to this aspect, since it is less likely to be affected by substances other than the specific substance, it is possible to accurately determine the concentration of the microbial particles.

Preferably, in the microbial particle measuring apparatus and the microbial particle measuring method, the concentration of the microbial particles is determined from the attenuation amount of the fluorescence intensity in the time period in which the above-described slope is smaller than a predetermined value based on a predetermined relational expression indicating a relationship between the attenuation amount of the fluorescence intensity and the concentration of the microbial particles.

From the results of the experiments, it has been derived that a certain proportional relationship is established between the attenuation amount of the fluorescence intensity and the concentration of the microbial particles. In this aspect, the relational expression indicating the proportional relationship derived from the results of the experiments is applied to determine the concentration of the microbial particles. Therefore, according to this aspect, the concentration of the microbial particles can be determined with higher accuracy.

Preferably, in the microbial particle measuring apparatus and the microbial particle measuring method, inflow and discharge of the fluid are stopped over a predetermined measurement time.

According to this aspect, it is possible to secure a time for continuously irradiating the particles contained in the fluid with the light of the predetermined wavelength. Therefore, the attenuation of the fluorescent substance contained in the microbial particles can be more suitably advanced. As a result, the concentration of the microbial particles can be determined more accurately.

In the microbial particle measuring apparatus and the microbial particle measuring method, instead of the above-described structure, the fluid may be irradiated with the light of the predetermined wavelength, the fluorescence emitted from the particles contained in the fluid may be selectively received, and the signal output with the magnitude corresponding to the intensity of the fluorescence may be obtained. After that, the slope of the waveform of the signal obtained may be calculated, and the particles whose fluorescence has been received may be counted as the microbial particles when there is the time period in which the slope is smaller than the predetermined value, or when the slope is smaller than the predetermined value.

According to this aspect, since the concentration of the microbial particles in the fluid is low, even if it is difficult to capture the microbial particles contained in the fluid as the particle group, the microbial particles are counted according to the slope of the signal of the fluorescence received, so that the microbial particles can be accurately counted.

More preferably, in the microbial particle measuring apparatus and the microbial particle measuring method, the light in a predetermined wavelength range that is emitted from the particles is transmitted, so that light other than the fluorescence emitted from the particles is reduced and the fluorescence in the predetermined wavelength range is selectively received.

When irradiated with the light of the predetermined wavelength, the wavelength range of the fluorescence emitted from the particles varies depending on the fluorescent substance excited by the irradiated light. In this regard, according to this aspect, it is possible to favorably receive autofluorescence derived from the specific substance (for example, tryptophan and tyrosine) that is used as the index and contained in the microbial particles. In addition, it is possible to avoid effects of other light emitted from the particles as much as possible.

Even more preferably, in the microbial particle measuring apparatus and the microbial particle measuring method, the light of the predetermined wavelength (for example, 280 nm) in an absorption wavelength range of tryptophan and tyrosine is irradiated, and light in a wavelength range (for example, 330 to 400 nm) longer than a wavelength of Raman scattered light that is generated when the fluid is a liquid is transmitted, so that the fluorescence emitted from the particles is selectively received.

According to this aspect, by utilizing properties of tryptophan and tyrosine, which have a strong absorption band at 250 to 300 nm and strong autofluorescence at 300 to 400 nm, the irradiation with deep ultraviolet rays of 280 nm makes it possible to favorably receive the autofluorescence emitted from the microbial particles in the wavelength range of 330 to 400 nm. When the fluid is the liquid and the fluid is, for example, irradiated with deep ultraviolet rays of 280 nm, the Raman scattered light appears near 310 nm due to action with water. Further, when the fluid is irradiated with deep ultraviolet rays of 254 nm, the Raman scattered light appears near 280 nm due to the action with water. In this regard, it is preferable to transmit the light in the wavelength range longer than the wavelength of the Raman scattered light, such that when irradiating the fluid with deep ultraviolet rays of 280 nm, the light in the wavelength range of 330 to 400 nm is transmitted, and when irradiating the fluid with deep ultraviolet rays of 254 nm, the light in the wavelength range of 300 to 400 nm is transmitted. Thus, transmission of the autofluorescence and reduction of the Raman scattered light can be performed at the same time. Therefore, according to this aspect, it is possible to more favorably receive the autofluorescence derived from the microbial particles. As a result, the concentration of the microbial particles can be determined more accurately.

As described above, according to the aspect of the present disclosure, the concentration of the microbial particles can be accurately measured.

Hereinafter, embodiments of the present disclosure will be described with reference to the drawings. Note that the following embodiments are preferable examples, and the present disclosure is not limited to the examples.

Structure of Microbial Particle Measuring Apparatus: First Embodiment

FIG. 1 is a diagram schematically illustrating a structure of a microbial particle measuring apparatus 1 according to a first embodiment. In order to facilitate understanding of the technique according to the first embodiment, illustration of a part of the structure is omitted in FIG. 1. The microbial particle measuring apparatus is an aspect of an apparatus for measuring the concentration and/or the number of the microbial particles. The function of such an apparatus is not restricted due to designations such as the microbial particle measuring apparatus or a microbial particle measuring device.

As illustrated in FIG. 1, the microbial particle measuring apparatus 1 mainly includes a detection unit 2 and a measurement unit 3. Among them, the detection unit 2 irradiates a sample fluid with light having a predetermined wavelength. Further, the detection unit 2 detects various kinds of light generated by interaction between irradiation light and particles P contained in the sample fluid, that is, the microbial particles and the non-microbial particles. The measurement unit 3 controls irradiation and reception of the light by the detection unit 2. Further, the measurement unit 3 measures the concentration of the microbial particles contained in the sample fluid based on a received light signal. In the microbial particle measuring apparatus 1, the detection unit 2 and the measurement unit 3 cooperate with each other to measure the concentration of the microbial particles. In the following description, a series of processes performed by the detection unit 2 and the measurement unit 3 may be collectively referred to as "measurement".

By the way, components of cells of the microbial particles including microorganisms include proteins. Ultraviolet rays are used for sterilization in various fields such as food and medicine. This is because the protein has a strong absorption band near 280 nm (250 to 300 nm), and thus the principle is applied that the protein is decomposed when the microbial particles are irradiated with ultraviolet rays in this wavelength range. More specifically, it is widely known that among protein constituents, tryptophan and tyrosine, which are one of amino acids, have the strong absorption band near 280 nm (250 to 300 nm) and strong autofluorescence at 300 to 400 nm. When tryptophan and tyrosine are irradiated with ultraviolet rays in the wavelength range of the absorption band, immediately after that, the autofluorescence is excited and emits strong autofluorescence. On the other hand, photolysis of tryptophan and tyrosine also proceeds at the same time by irradiation with ultraviolet rays. Therefore, intensity of the autofluorescence is attenuated as time elapses.

The detection unit 2 uses the properties of tryptophan and tyrosine described above to detect the fluorescence generated from the particles P contained in the sample fluid. Absorption spectra of tryptophan and tyrosine, and excitation and fluorescence spectra of bacteria before and after irradiation with deep ultraviolet rays will be further described below with reference to another drawing.

The detection unit 2 includes a light emitter 10, an irradiation lens 20, a flow cell 30, a light receiver 100, and the like. The light emitter 10 is, for example, a deep ultraviolet LED (DUV-LED) that emits light in a UV-C wavelength range. The light emitter 10 emits the irradiation light toward the flow cell 30. The light emitter 10 emits the light having the predetermined wavelength in the absorption wavelength range of tryptophan and tyrosine. In the present embodiment, in order to maximize absorption efficiency of tryptophan and tyrosine, wavelength 280 nm is employed as a wavelength of the irradiation light. The irradiation lens 20 is provided on an optical path of the irradiation light. The irradiation lens 20 includes, for example, optical lenses such as a collimator lens, a biconvex lens, and a cylindrical lens. The irradiation lens 20 adjusts a divergence angle of the irradiation light emitted from the light emitter 10 to be not more than parallel, and focuses the irradiation light inside the flow cell 30. The flow cell 30 is formed of a transparent material such as quartz or sapphire in a tubular shape. An inside of the flow cell 30 is used as a flow passage for the sample fluid.

An upstream portion of the flow cell 30 (a lower portion of the flow cell 30 in FIG. 1) is connected to a pipe branched from a pipe which is provided in a factory equipment or the like and through which the sample fluid flows. The sample fluid is caused to flow into the flow cell 30 through this pipe. An end of a pipe connected to a downstream portion of the flow cell 30 (an upper portion of the flow cell 30 in FIG. 1) is closed by a discharge valve 34. The discharge valve 34 is a valve that controls discharge and flow rate of the sample fluid. By opening the discharge valve 34, the sample fluid is discharged to an outside of the flow cell 30. In the first embodiment, the measurement is performed with inflow of the sample fluid stopped and the discharge valve 34 closed, that is, with flow of the sample fluid stopped. The flow rate can be controlled by increasing or decreasing an opening area of the discharge valve 34. Further, when measuring the sample fluid in a container such as a beaker, a pump (not shown) is provided downstream of the discharge valve 34. The pump is a device that controls the inflow of the sample fluid. In this case, the sample fluid is caused to flow into the flow cell 30 by operation of the pump.

When the irradiation light is emitted from the light emitter 10 toward the flow cell 30 in which the sample fluid flows, the irradiation light is condensed by the irradiation lens 20 and enters the flow cell 30. Thus, a detection region for detecting light generated from the particles P contained in the sample fluid is formed at a predetermined position inside the flow cell 30. When the irradiation light is absorbed by tryptophan or tyrosine in the cells of the microbial particles, the autofluorescence of tryptophan or tyrosine is excited and the fluorescence in the wavelength range of 300 to 400 nm is emitted with high intensity.

The light receiver 100 is provided at a position opposite to the light emitter 10 through the flow cell 30, that is, at a front position in an optical axis of the irradiation light. The light receiver 100 is an example of a fluorescence light receiver, and includes an optical filter 64 that transmits the fluorescence in a predetermined wavelength range, a fluorescence receiving element 70 for receiving the fluorescence, and the like. The light receiver 100 selectively receives the light generated by the interaction between the particles P passing through the detection region and the irradiation light, and then outputs an electric signal (the received light signal) having a magnitude corresponding to an amount of received light. The light receiver 100 may be provided at a position lateral to the optical axis of the irradiation light. A structure of the light receiver 100 will be described below in detail with reference to the following drawing.

The measurement unit 3 includes a storage unit 200, an operation input unit 210, a controller 220, a signal processor 230, an analyzer 240, a result output unit 250, and the like. Among them, the controller 220 controls operations of devices constituting the detection unit 2. The controller 220 controls, for example, emission of the irradiation light by the light emitter 10, opening and closing of the discharge valve 34, and light reception by the light receiver 100. The signal processor 230 processes the electric signal output from the light receiver 100. A structure of the measurement unit 3 will be described below in detail with reference to another drawing.

Figure 2:
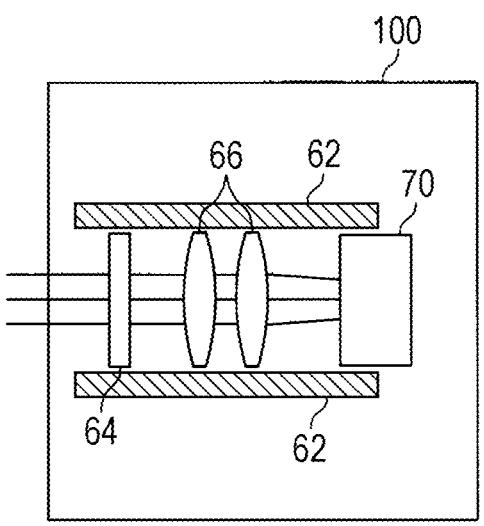
FIG. 2 illustrates a structure of a light receiver in the first embodiment.

FIG. 2 is a diagram illustrating the structure of the light receiver 100 in the first embodiment.

As described above, when the particles P (microbial particles and non-microbial particles) pass through the detection region formed inside the flow cell 30, the fluorescence and the scattered light are emitted from the particles P by the interaction between the particles P and the irradiation light. Further, when the sample fluid is the liquid, the Raman scattered light due to water is also emitted. The lights, which are emitted in the detection region, enter the light receiver 100. Further, when the light receiver 100 is provided at the front position in the optical axis of the irradiation light, the irradiation light transmitted through the flow cell 30 without acting on the particles P in the detection region also enters the light receiver 100. When the light receiver 100 is provided at the position lateral to the optical axis of the irradiation light, the irradiation light transmitted through the flow cell 30 without acting on the particles P in the detection region does not enter the light receiver 100.

The optical filter 64 is disposed at a position where light enters the light receiver 100. The optical filter 64 transmits the light in a predetermined wavelength range that is emitted from the particles P contained in the sample fluid. The optical filter 64 is, for example, a bandpass filter. In the present embodiment, tryptophan and tyrosine, which have strong autofluorescence at 300 to 400 nm, are used as the indexes. Therefore, in response to the indexes, the bandpass filter that transmits light of 330 to 380 nm is employed. When the sample fluid is the liquid and the sample fluid is irradiated with light of 280 nm, the Raman scattered light appears near 310 nm. Therefore, by setting a transmission wavelength band of the optical filter 64 to 330 to 380 nm, it is possible to cut the Raman scattered light while transmitting the fluorescence in this wavelength range. The transmission wavelength band of the optical filter 64 is not limited to this. For example, the transmission wavelength band can be set to 330 to 400 nm by extending the upper limit.

A light receiving lens 66 is disposed on the optical path of the light transmitted through the optical filter 64, that is, the fluorescence. The fluorescence is condensed by the light receiving lens 66 and enters the fluorescence receiving element 70. The fluorescence receiving element 70 is, for example, a photodiode (PD, semiconductor optical element) or a photomultiplier tube (PMT). The fluorescence receiving element 70 outputs the electric signal according to a voltage value having a magnitude corresponding to the intensity (light amount) of the received light. The electric signal output from the fluorescence receiving element 70 is input to the signal processor 230 of the measurement unit 3.

The optical path until the light entering the light receiver 100 reaches the fluorescence receiving element 70 is covered by a light shielding wall 62. The light shielding wall 62 is, for example, a tubular structure. The light shielding wall 62 can restrain the light other than the fluorescence from entering the fluorescence receiving element 70.

Figure 3:
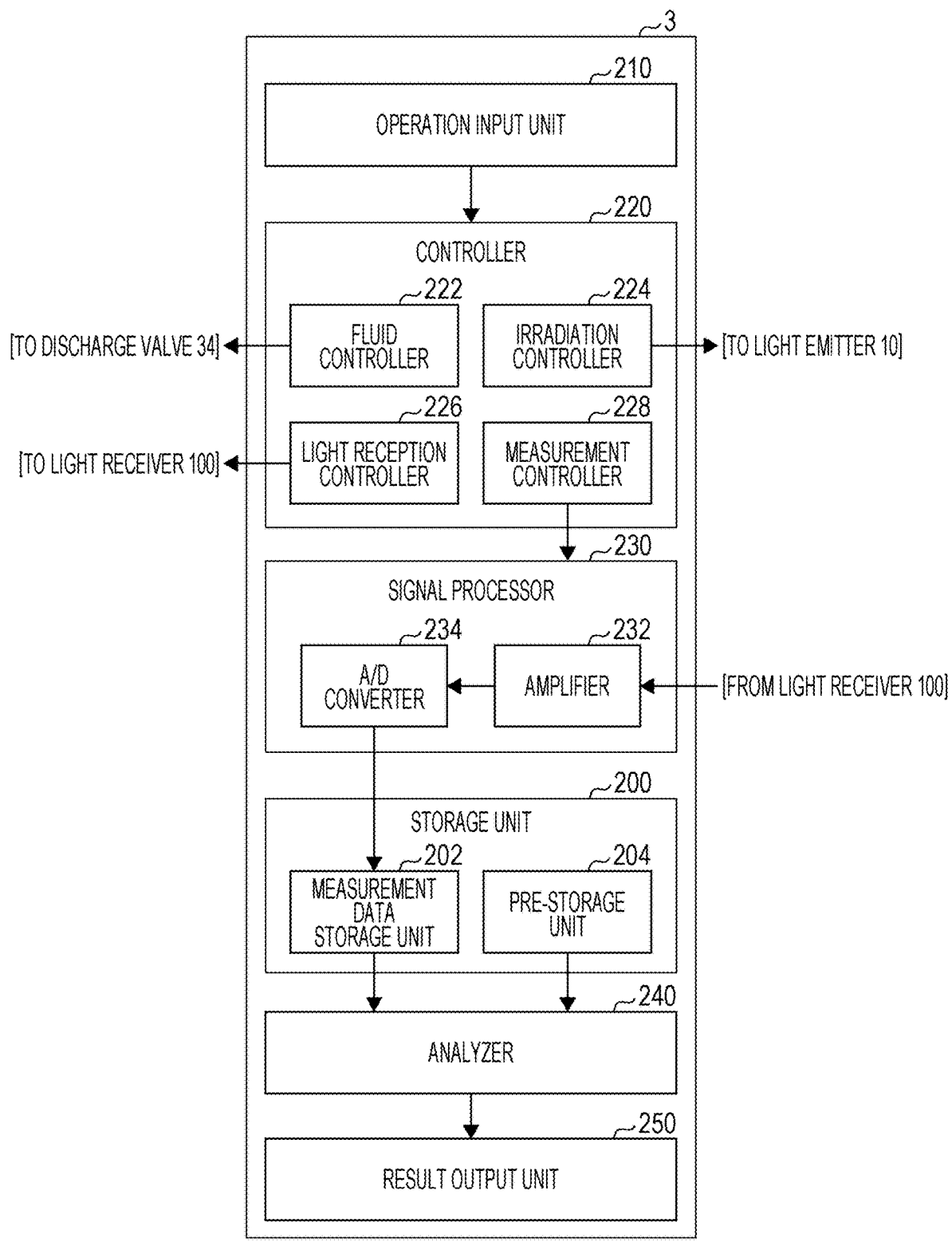
FIG. 3 is a functional block diagram illustrating a structure of a measurement unit in the first embodiment.

FIG. 3 is a functional block diagram illustrating the structure of the measurement unit 3 in the first embodiment.

The measurement unit 3 includes, for example, the storage unit 200, the operation input unit 210, the controller 220, the signal processor 230, the analyzer 240, and the result output unit 250. For convenience of description, each function will be described here along a processing flow of using the microbial particle measuring apparatus 1.

The operation input unit 210 provides a user with an operation unit having a screen, buttons, and the like. Further, the operation input unit 210 receives an operation performed by the user through the operation unit. The user can perform a measurement start operation and operations such as setting timers related to the measurement (for example, a timer that performs the measurement at a predetermined time and a timer that repeats the measurement periodically) through the operation unit. Upon receiving the measurement start operation, the operation input unit 210 instructs the controller 220 to start the measurement. The operation input unit 210 may be configured to receive a remote operation performed through a network such as the Internet and a wireless LAN.

The controller 220 controls the operations related to the measurement on various components constituting the detection unit 2. The controller 220 has, for example, a fluid controller 222, an irradiation controller 224, a light reception controller 226, and a measurement controller 228. The fluid controller 222 controls opening and closing of the discharge valve 34. The irradiation controller 224 controls start and end (a continuous irradiation time) of the emission of the irradiation light by the light emitter 10. The light reception controller 226 controls start and end of the light reception by the light receiver 100. The measurement controller 228 controls sampling of the electric signal output from the light receiver 100.

The signal processor 230 is an example of a signal acquisition unit, receives the electric signals output from the light receiver 100 from start to end of the sampling of the electric signals by an instruction from the measurement controller 228, and performs processes required for the signals. The signal processor 230 has, for example, an amplifier 232 and an A/D converter 234. The amplifier 232 amplifies the received electric signal with a predetermined amplification factor. Further, the A/D converter 234 samples the electric signal (an analog signal) amplified by the amplifier 232 at predetermined intervals (at every fixed time) and converts it into a digital signal. The digital signal converted by the A/D converter 234 is stored in the storage unit 200.

When power of the microbial particle measuring apparatus 1 is turned on, the light receiver 100 starts to receive light, and the electric signal is output and input to the amplifier 232. At this point, the sampling by the A/D converter 234 has not started yet. Thereafter, when measurement start is instructed, first, the fluid controller 222 switches the discharge valve 34 to a closed state, closes a discharge port of the sample fluid, and stops the inflow of the sample fluid over the predetermined measurement time. This stops the flow of the sample fluid inside the flow cell 30 and stabilizes the sample fluid. Then, the irradiation controller 224 causes the light emitter 10 to start emitting the irradiation light. Thus, the irradiation light is emitted toward the flow cell 30. In response to the emission, the fluorescent substance of the particles P contained in the sample fluid reacts with the irradiation light on the order of microseconds and emits the fluorescence almost at the same time as the start of the emission of the irradiation light (in the following description, a timing of microseconds lapse after the start of the emission, in which the fluorescent substance of the particles P emits the fluorescence in response to the irradiation light, is referred to as "immediately after irradiation").

Immediately after these preparations are completed, the A/D converter 234 receives the instruction from the measurement controller 228, and starts the sampling of the electric signal output from the light receiver 100 and amplified by the amplifier 232. The sampling is performed at the predetermined intervals (for example, every 100 to 500 ms) over a preset measurement time (for example, 30 seconds). Data obtained by the sampling is stored in the storage unit 200 through the signal processor 230 described below. The emission of the irradiation light and the sampling of the electric signal may be started at the same time. Alternatively, in order to stabilize the irradiation light, start timings of both may be intentionally shifted. That is, the sampling of the electric signal may be started after an extremely short time has elapsed after the emission of the irradiation light was started.

Thereafter, when the measurement time elapses, the measurement controller 228 ends the sampling of the electric signal, and the irradiation controller 224 ends the emission of the irradiation light by the light emitter 10. Further, the fluid controller 222 switches the discharge valve 34 to an open state to discharge the sample fluid retained inside the flow cell 30 to the outside.

The storage unit 200 is a so-called storage area (memory), and has, for example, a measurement data storage unit 202 and a pre-storage unit 204. The measurement data storage unit 202 stores the digital signal converted by the A/D converter 234. Thus, the measurement data storage unit 202 stores the sampling data of a signal waveform. The measurement data storage unit 202 can also store a determination result and the like in addition to sampling a signal waveform. On the other hand, the pre-storage unit 204 stores in advance information necessary for determining the concentration of the microbial particles based on the data obtained by the sampling, which has been found through the experiments by the inventors. The information found by the inventors will be further described below with reference to another drawing.

The analyzer 240 is an example of a determiner and a counter, and analyzes the data stored in the measurement data storage unit 202 as a result of the sampling. Further, the analyzer 240 determines the concentration of the microbial particles based on this analysis result and the data stored in advance in the storage unit 204. Specific contents of a process performed by the analyzer 240 will be described below in detail with reference to another drawing.

The result output unit 250 outputs the determination result by the analyzer 240. The output of determination result may be performed by displaying numerical values (characters) and marks (images) on the screen, or by using a speaker to output sound corresponding to the mode according to the result. Further, the output of the determination result can also be performed by using a printer or by transmitting it to another device through the network.

[Microbial Particle Measurement Processing]

FIG. 4 is a flowchart illustrating a procedure example of a microbial particle measurement processing in the first embodiment.

The microbial particle measurement processing is a process performed by the measurement unit 3 for one measurement when an operation for instructing measurement start is performed through the operation unit provided in the microbial particle measuring apparatus 1, or when a measurement start time set by a timer is reached. Hereinafter, the microbial particle measurement processing will be described along with the procedure example.

Step S10: The measurement unit 3 first performs a data collection process. In this process, the controller 220 controls the detection unit 2 to prepare the sample fluid, the irradiation light, and the light reception. That is, the light emitter 10 irradiates the sample fluid with the light of the predetermined wavelength over the predetermined measurement time. Then, the light receiver 100 selectively receives the fluorescence emitted from the particles contained in the sample fluid, and outputs the electric signal having the magnitude corresponding to the intensity of the fluorescence.

Thereafter, the signal processor 230 performs the sampling of the electric signals at the predetermined intervals (at every fixed time) over the preset measurement time. The signal processor 230 causes the measurement data storage unit 202 to store the data obtained by the sampling. In this way, the sampling data is collected by performing the data collection process.

Step S20: The measurement unit 3 next performs a data analysis process. In this process, the analyzer 240 analyzes the data collected in Step S10 described above. The analyzer 240 determines the concentration of the microbial particles in the sample fluid based on this analysis result and information stored in advance in the pre-storage unit 204. Specific contents of the data analysis process will be described below in detail with reference to the following drawing.

Step S30: Then, the measurement unit 3 performs an analysis result output process. In this process, the result output unit 250 outputs a result of the data analysis process performed in Step S20 described above, that is, the determination result on the concentration of the microbial particles, as characters, images, sound, or the like. The result output unit 250 may transfer the determination result through the network.

The above procedure example is merely given as an example, and other steps may be performed together. For example, after the analysis result output process, as a post-process after measurement, the measurement control unit 228 can switch control of the detection unit 2 (end the emission of the irradiation light, discharge the sample fluid) and/or signal waveform data obtained by sampling can be deleted from the measurement data storage unit 202.

Data Analysis Process: First Embodiment

FIG. 5 is a flowchart illustrating a procedure example of the data analysis process in the first embodiment.

The data analysis process is a process performed by the analyzer 240 of the measurement unit 3 in a process of the microbial particle measurement processing described above. Hereinafter, the data analysis process will be described along with the procedure example.

Step S100: The analyzer 240 reads the sampling data stored in the measurement data storage unit 202 and calculates the slope of the sampled signal waveform. The slope of the signal waveform may be calculated by differentiating the signal waveform, or may be calculated by obtaining a difference (the amount of attenuation) in fluorescence intensity from two consecutive sampling data (data of the Nth sampling and the immediately preceding N-lth sampling). Alternatively, the slope of the signal waveform may be calculated by other methods.

Step S110: The analyzer 240 derives a time period Δt in which the slope of the signal waveform calculated in Step S100 described above is smaller than a predetermined value. The predetermined value of the slope is a value found by the inventors through the experiments. The predetermined value of the slope is, so to speak, a value (negative number) corresponding to the attenuation rate of the fluorescence intensity (progress degree of attenuation) at a time it is considered that decomposition of tryptophan and tyrosine is completed.

In the present embodiment, if there is the time period Δt in which the slope is smaller than the predetermined value (gradient is steep), the analyzer 240 determines that the attenuation of the fluorescence intensity in the time period Δt is due to fluorescent components derived from tryptophan and tyrosine, that is, the microbial particles are included in the particle group that emits the fluorescence in the time period Δt. On the other hand, the analyzer 240 determines that the attenuation of the fluorescence intensity in a time period in which the slope is not smaller than the predetermined value (gradient is gentle) is due to other fluorescent components (fluorescent components derived from the non-microbial particles) contained in a medium, that is, the microbial particles are not included in the particle group that emits the fluorescence in the time period. Further, when the fluorescence intensity does not reach a predetermined magnitude, the analyzer 240 considers that the fluorescence is generated from the other fluorescent components included in the medium, and determines that the microbial particles that emit the fluorescence are not included. A change in fluorescence intensity over time before and after irradiation with deep ultraviolet rays will be further described below with reference to another drawing.

Step S120: The analyzer 240 calculates the attenuation amount of the fluorescence intensity in the time period Δt in which the slope of the signal waveform determined in Step S110 described above is smaller than the predetermined value. Thus, the attenuation amount of the fluorescent components derived from tryptophan and tyrosine, that is, the amount of attenuation corresponding to the microbial particles is calculated.

Step S130: The analyzer 240 determines the concentration of the microbial particles from the attenuation amount of the fluorescence intensity calculated in Step S120 described above, on the basis of the data that is stored in advance in the pre-storage unit 204 and based on the relational expression indicating the relationship between the attenuation amount of the fluorescence intensity and the concentration of the microbial particles. The relationship between the attenuation amount of the fluorescence intensity and the concentration of the microbial particles will be further described below with reference to another drawing.

[Absorption Spectra of Tryptophan and Tyrosine]

Figure 6:
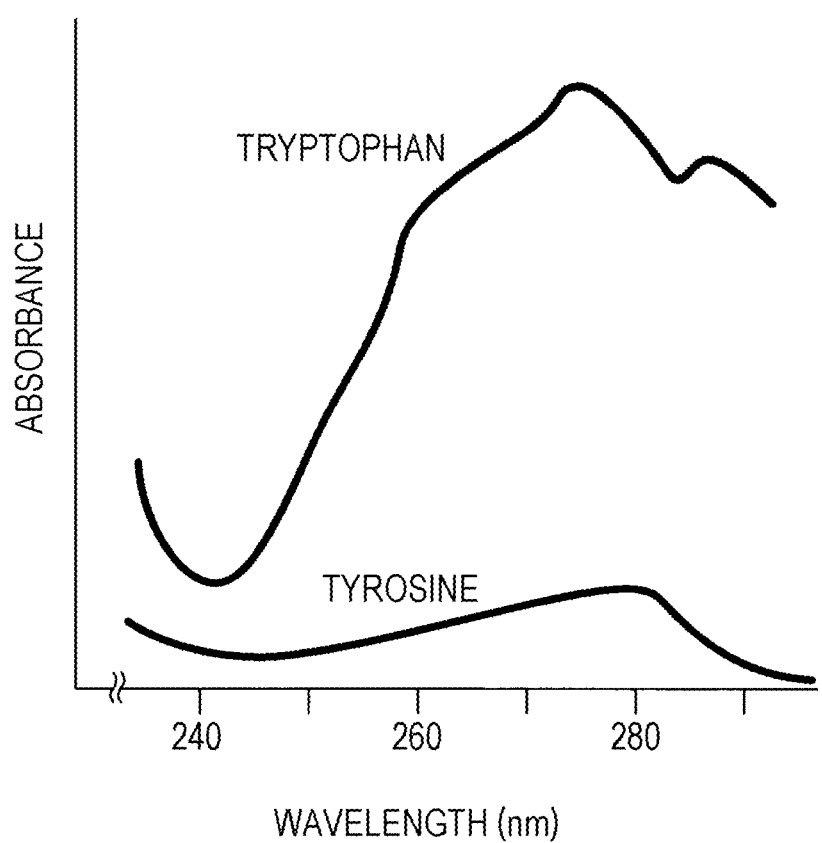
FIG. 6 is a graph illustrating absorption spectra of tryptophan and tyrosine.

FIG. 6 is a graph illustrating the absorption spectra of tryptophan and tyrosine. From this graph, it is understood that both tryptophan and tyrosine have a property of absorbing light (deep ultraviolet rays) having a wavelength near 280 nm well.

[Excitation/Fluorescence Spectra of Tryptophan and Tyrosine]

Figure 7A:
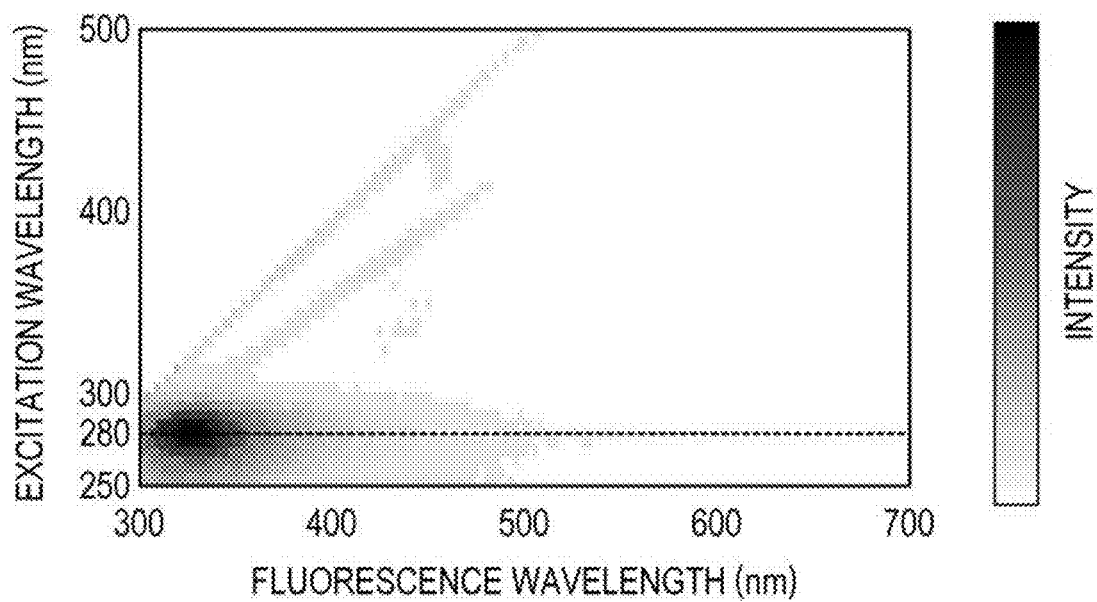
FIGS. 7A and 7B are graphs illustrating autofluorescence spectra of bacteria before and after irradiation with deep ultraviolet rays to a bacterial solution of bacteria of the genus *Methylobacterium*.
Figure 7B:
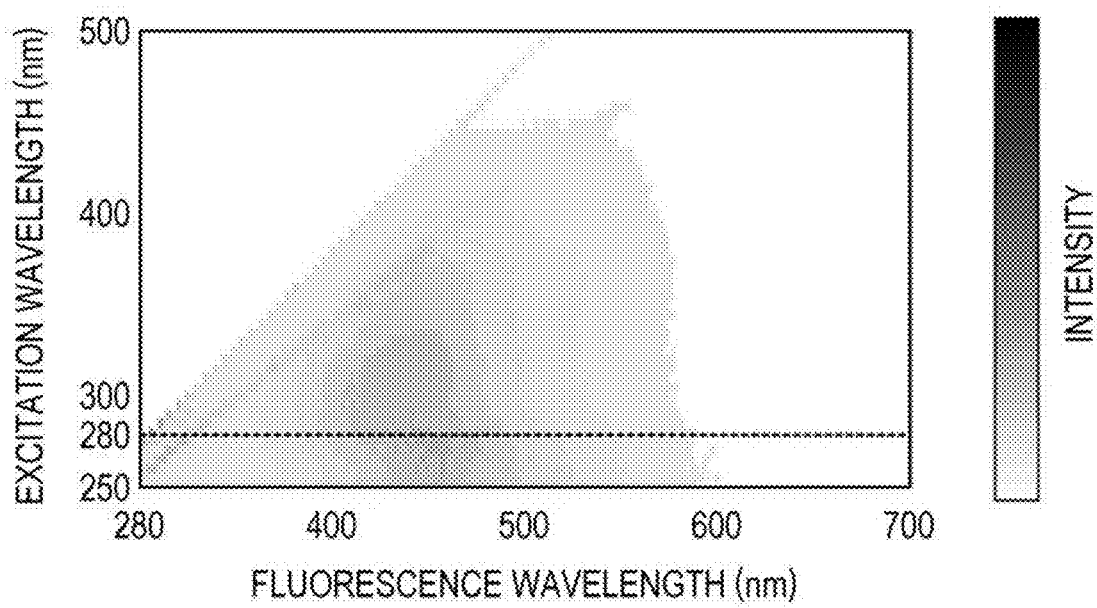

FIGS. 7A and 7B are graphs illustrating a result of having measured, with a spectrofluorometer, autofluorescence spectra of the bacteria before and after irradiation with deep ultraviolet rays to a bacterial solution of the genus *Methylobacterium*, more accurately, *Methylobacterium extorquens* (NBRC15911).

Figure 8A:
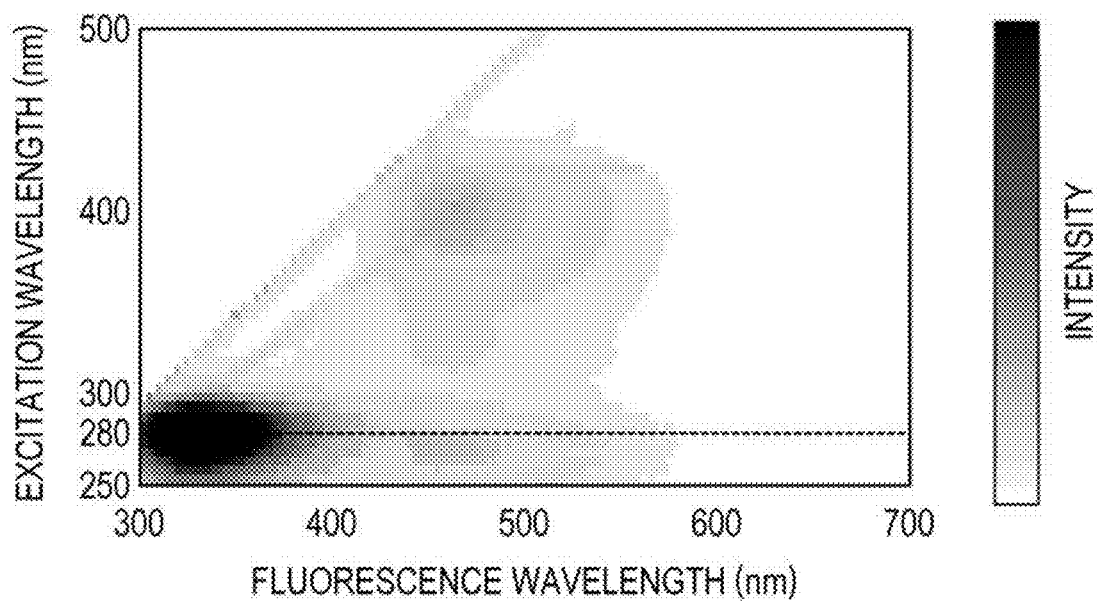
FIGS. 8A and 8B are graphs illustrating the autofluorescence spectra of the bacteria before and after irradiation with deep ultraviolet rays on the bacterial solution of bacteria of the genus *Pseudomonas*.
Figure 8B:
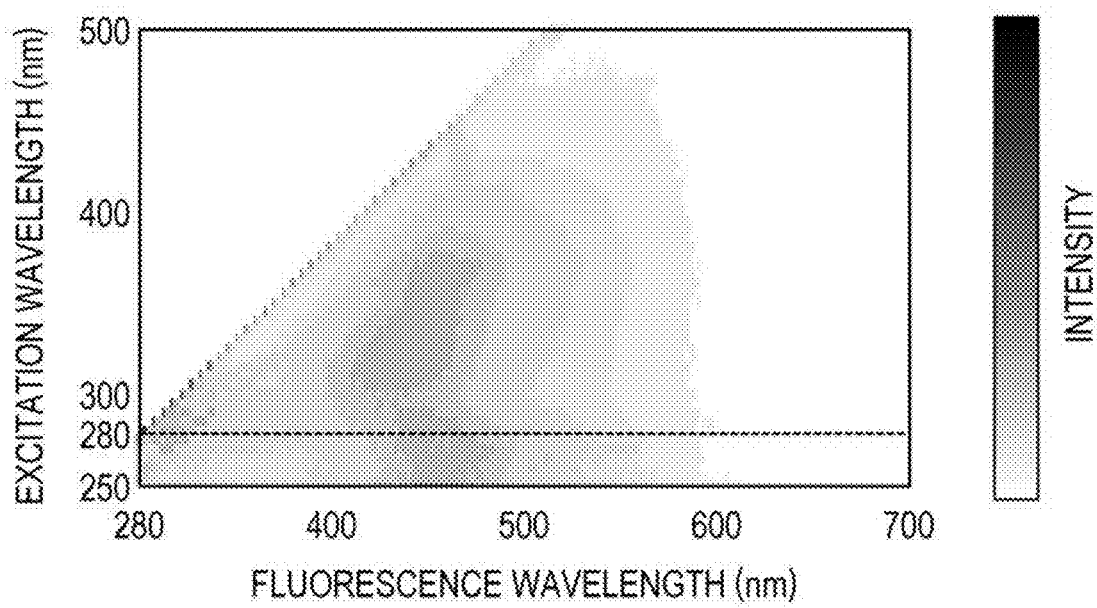

FIGS. 7A and 8A illustrate a state before (immediately after) irradiation with deep ultraviolet rays. FIGS. 7B and 8B illustrate a state after irradiation with deep ultraviolet rays, more accurately, a state at the time the predetermined time elapses from the irradiation. A horizontal axis of each graph indicates a fluorescence wavelength, a vertical axis indicates an excitation wavelength, and shading of distribution indicates the fluorescence intensity. Then, in FIGS. 7A and 8A, pale straight lines extending to the upper right from coordinates of 300 nm in both the excitation wavelength and the fluorescence wavelength, and in FIGS. 7B and 8B, pale straight lines extending to the upper right from coordinates of 280 nm in both the excitation wavelength and the fluorescence wavelength, indicate the irradiation light. In FIGS. 7A, 8A, 7B, and 8B, pale straight lines extending to the upper right, below the straight lines indicating the irradiation light, indicates the Raman scattered light.

As illustrated in FIGS. 7A and 7B, before irradiation with deep ultraviolet rays, high intensity fluorescence is detected at about 300 to 400 nm for excitation light of 280 nm. Specifically, very high intensity fluorescence is detected at about 320 to 350 nm. The fluorescence is the autofluorescence derived from tryptophan and tyrosine contained in the bacteria. On the other hand, after irradiation of deep ultraviolet rays, the fluorescence is hardly detected at about 300 to 400 nm. This change before and after the irradiation indicates that tryptophan and tyrosine were photolyzed by the irradiation of deep ultraviolet rays, and thus the autofluorescence derived from these substances almost disappeared.

After irradiation with deep ultraviolet rays, low intensity fluorescence is detected at about 400 to 500 nm. The fluorescence is the autofluorescence derived from flavin and other substances contained in the bacteria. On the other hand, before irradiation of deep ultraviolet rays, the fluorescence is hardly detected in this wavelength range. This change before and after the irradiation indicates that autofluorescence properties of flavin and other substances was mutated by the irradiation of deep ultraviolet rays, and thus the autofluorescence intensity was increased as compared with that before irradiation of deep ultraviolet rays.

FIGS. 8A and 8B are graphs illustrating a result of having measured, with the spectrofluorometer, the autofluorescence spectra of the bacteria before and after irradiation with deep ultraviolet rays to the bacterial solution of the genus *Pseudomonas*, more accurately, *Pseudomonas* fluorescence (ATCC17386).

As illustrated in FIGS. 8A and 8B, before irradiation of deep ultraviolet rays, the high intensity fluorescence is detected at about 300 to 400 nm for the excitation light of 280 nm. Specifically, very high intensity fluorescence is detected at about 305 to 375 nm. The fluorescence is the autofluorescence derived from tryptophan and tyrosine contained in the bacteria. Further, the low intensity fluorescence is detected at about 430 to 500 nm for the excitation light near 280 nm and near 400 nm. These are the autofluorescence derived from pyoverdine, which is specific to fluorescent bacteria and *Pseudomonas aeruginosa*.

On the other hand, after irradiation with deep ultraviolet rays, the fluorescence intensity is extremely low at about 300 to 400 nm. This change before and after the irradiation indicates that tryptophan and tyrosine were photolyzed by the irradiation of deep ultraviolet rays, and thus the autofluorescence derived from these substances was significantly attenuated. Further, after irradiation with deep ultraviolet rays, the low intensity fluorescence is detected at about 400 to 520 nm in addition to the autofluorescence derived from pyoverdine detected before irradiation with deep ultraviolet rays (distribution area is wider than before irradiation). This change before and after the irradiation indicates that the autofluorescence properties of flavin and other substances contained in the bacteria was mutated by the irradiation of deep ultraviolet rays, and thus the autofluorescence intensity was increased as compared with that before irradiation of deep ultraviolet rays.

Thus, from the graphs illustrated in FIGS. 7A and 7B, and FIGS. 8A and 8B, it is understood that the bacteria have very strong autofluorescence, which is derived from tryptophan and tyrosine and has a peak at about 320 to 350 nm, and the autofluorescence disappears or is significantly attenuated by the irradiation with deep ultraviolet rays (ultraviolet rays near 280 nm). The wavelength of the excitation light is not limited to 280 nm and may be any wavelength in the absorption wavelength range of tryptophan and tyrosine.

[Change of Fluorescence Intensity by Irradiation of Deep Ultraviolet Rays]

Figure 9:
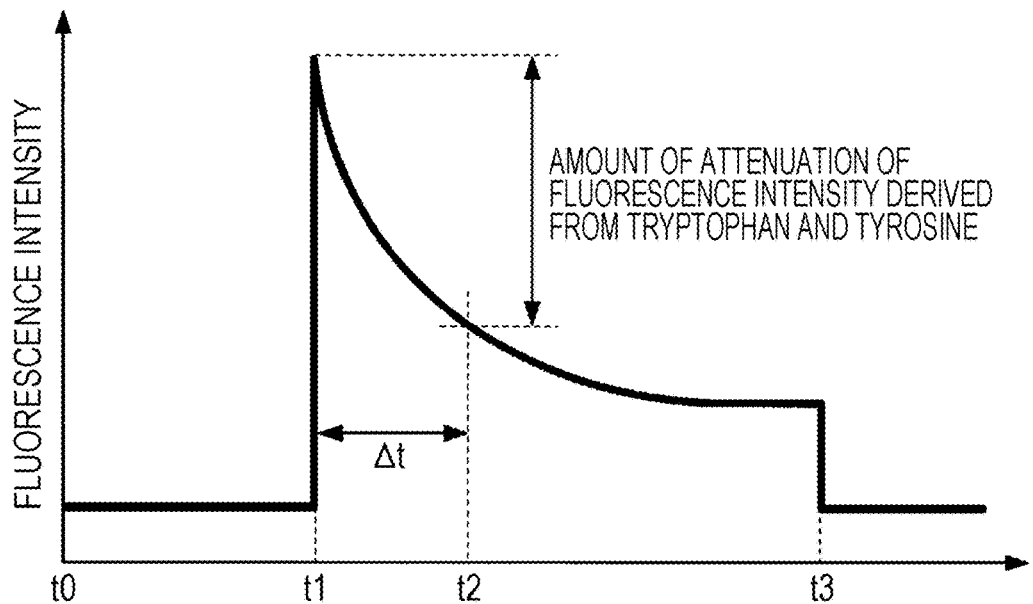
FIG. 9 is a graph illustrating a change in fluorescence intensity over time before and after irradiation with deep ultraviolet rays.

FIG. 9 is a graph illustrating the change in fluorescence intensity over time before and after irradiation with deep ultraviolet rays. Hereinafter, description will be made in time series.

Time t0: Fluorescence reception has already started. At this point, the deep ultraviolet rays have not yet been irradiated. Therefore, the intensity of the received fluorescence is very low.

Time t1: When the measurement start is instructed, the flow of the sample fluid is stopped, and the irradiation of deep ultraviolet rays is started. Then, the sampling of the received light signal is started at the same time as or immediately after the irradiation start of the deep ultraviolet rays. The sampling is performed at the predetermined intervals (for example, every 100 to 500 ms) over the preset measurement time (for example, 30 seconds).

The attenuation rate of the fluorescence intensity of the fluorescent components derived from tryptophan and tyrosine is very fast. Therefore, immediately after the irradiation start of the deep ultraviolet rays, the slope of the sampled signal waveform of the received light signal is smaller than a predetermined value (negative number), and the gradient of the signal waveform is steep. With the passage of time, the attenuation rate of the fluorescence intensity gradually decreases. Then, the slope of the signal waveform gradually increases, and the gradient of the signal waveform becomes gentle.

Time t2: The slope of the sampled signal waveform of the received light signal becomes equal to or more than the predetermined value. Therefore, in the analysis process, a time period from time t1 to time t2 is determined as the time period Δt in which the slope of the signal waveform is smaller than the predetermined value. The attenuation amount of the fluorescence intensity in the time zone Δt is calculated as the attenuation amount of the fluorescent components derived from tryptophan and tyrosine, that is, the amount of attenuation corresponding to the microbial particles.

Time t3: The irradiation of deep ultraviolet rays and the sampling of the received light signal are ended. Then, the intensity of the received fluorescence decreases to a level before the irradiation start of the deep ultraviolet rays. The attenuation amount of the fluorescence intensity in a time period from time t2 to time t3 is considered as the attenuation amount of the fluorescent components derived from the non-microbial particles.

The above measurement time may be sufficiently set to a length in which tryptophan and tyrosine are sufficiently decomposed by the irradiation with deep ultraviolet rays in consideration of conditions, such as measurement accuracy, storage area capacity and power consumption.

[Relationship Between Attenuation Amount of Fluorescence Intensity and Concentration of Microbial Particles]

Figure 10:
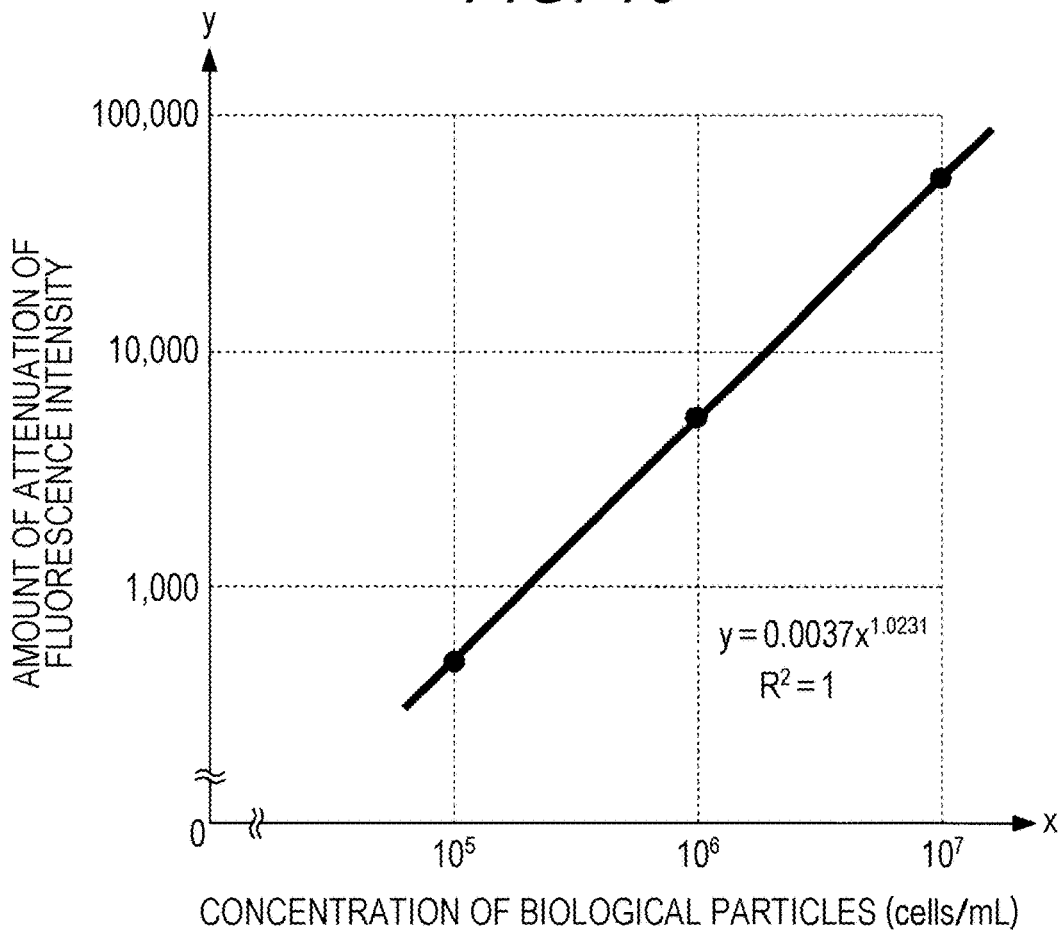
FIG. 10 is a graph illustrating a relationship between an attenuation amount of the fluorescence intensity and a concentration of microbial particles.

FIG. 10 is a graph illustrating the relationship between the attenuation amount of the fluorescence intensity derived from tryptophan and tyrosine and the concentration of the microbial particles.

This graph illustrates the relationship between the attenuation amount of the fluorescence intensity and the concentration of the microbial particles at 330 to 380 nm. The relationship was determined based on a result of having measured, with the spectrofluorometer, the fluorescence spectra before and after irradiation with excitation light of 280 nm to bacterial suspension samples having different concentrations. In the measurement, the bacterial suspension samples with three concentrations (about $1 \times 10^7$ cells/mL, about $1 \times 10^6$ cells/mL, and about $1 \times 10^5$ cells/mL) were used. The bacterial suspension samples were prepared using *Methylobacterium extorquens* (NBRC15911) cultured in R2A agar medium at 23° C. for 7 days and pure water. More precisely, before and after irradiation with excitation light means immediately after the irradiation start with excitation light and a time point when 30 seconds have elapsed from the irradiation start (after continuous irradiation for 30 seconds). The attenuation amount of the fluorescence intensity is calculated from a difference between measurement results at these two time points. As the spectrofluorometer, Model FP-8500 manufactured by JASCO Corporation was used. Further, irradiation of excitation light was performed at an irradiation intensity of 29.4 mW/cm$^2$ (WD=10 mm).

The attenuation amount of the fluorescence intensity in the bacterial suspension sample of each concentration was 53882.1 in the bacterial suspension sample of about $1 \times 10^7$ cells/mL, 5038.59 in the bacterial suspension sample of about $1 \times 10^6$ cells/mL, and 484.54 in the bacterial suspension sample of about $1 \times 10^5$ cells/mL. These results can be expressed by a relational expression "$y=0.0037x^{1.0231}$" (determination coefficient $R^2=1$), where y is the attenuation amount of the fluorescence intensity and x is the concentration of the microbial particles. As described above, as the results of the experiments by the inventors, it has been derived that a certain proportional relationship is established between the attenuation amount of the fluorescence intensity and the concentration of the microbial particles. In the analysis process, the concentration of the microbial particles is determined from the attenuation amount of the fluorescence intensity in the time period Δt based on the above relational expression.

Advantages of First Embodiment

As described above, the microbial particle measuring apparatus 1 of the first embodiment determines the concentration of microbial particles by capturing the microbial particles contained in the sample fluid as the particle group. According to the first embodiment, the following effects can be obtained.

(1) It is determined that the attenuation amount of the fluorescence intensity in the time period Δt in which the slope of the signal waveform indicating the fluorescence intensity is smaller than the predetermined value is the amount of attenuation due to the fluorescent components derived from tryptophan and tyrosine. The concentration of the microbial particles is determined based on the above-described relational expression from the attenuation amount of the fluorescence intensity in the time period Δt. Therefore, since it is less likely to be affected by the fluorescence derived from the non-microbial particles, determination accuracy of the concentration of the microbial particles can be improved.

(2) Consider a case where the measurement is performed for a fluid that has been subjected to sterilization treatment (for example, ultraviolet sterilization) such that tryptophan and tyrosine in the microbial particles are decomposed. In this case, the attenuation of the autofluorescence has already progressed by the applied sterilization treatment. Therefore, there is a possibility that no time period, in which the slope of the attenuation is smaller than the predetermined value in the measurement time, appears. In this case, it is determined that the microbial particles are not contained in the fluid. Therefore, by performing the measurement before and after the sterilization treatment, it is possible to determine on an active state of the microbial particles considered to have been contained in the fluid before the sterilization treatment.

(3) With one irradiation light, both the excitation and the photolysis of the autofluorescent substance derived from tryptophan and tyrosine are performed. Thus, it is not necessary to provide a plurality of types of light emitters. Therefore, manufacturing cost of the microbial particle measuring apparatus 1 can be reduced, and the microbial particle measuring apparatus 1 can be downsized.

(4) Tryptophan and tyrosine are used as the indexes. Further, a time in which the substances are sufficiently decomposed by the irradiation with deep ultraviolet rays is preset as the continuous irradiation time. Thus, it is not necessary to set different continuous irradiation times for each sample fluid to be measured. Therefore, versatility of the microbial particle measuring apparatus 1 can be enhanced.

(5) By combining the microbial particle measuring apparatus 1 with a turbidimeter, it is possible to get both the concentration of the microbial particles and the concentration of all particles (microbial particles and non-microbial particles).

Modification of First Embodiment

The microbial particle measuring apparatus 1 is not limited to the structure described above, and can be implemented with various modifications.

For example, the light receiver 100 may be provided with an optical mirror, a further light receiving lens, and a scattered light receiving element. In this structure, light other than the scattered light emitted from the particles P may be transmitted through the optical mirror and directed to the optical filter 64. Further, the scattered light emitted from the particles P may be reflected by the optical mirror, and condensed by the further light receiving lens, to enter the scattered light receiving element. With such a structure, it is possible to measure all the particles (particle group) including not only the particles that emit fluorescence but also the particles that do not emit fluorescence.

For example, when the concentration of the sample fluid is low, an L-shaped flow cell as disclosed in WO 2004/029589 A may be used. That is, using the flow cell, the sample fluid receives the fluorescence from an extending direction of the flow passage while the sample fluid flows at a low speed. In this way, by measuring the fluorescence intensity derived from tryptophan and tyrosine in each particle, it is possible to accurately count the number of microbial particles. An outline of this modification will be described with reference to FIGS. 11A, 11B and 12.

Figure 11A:
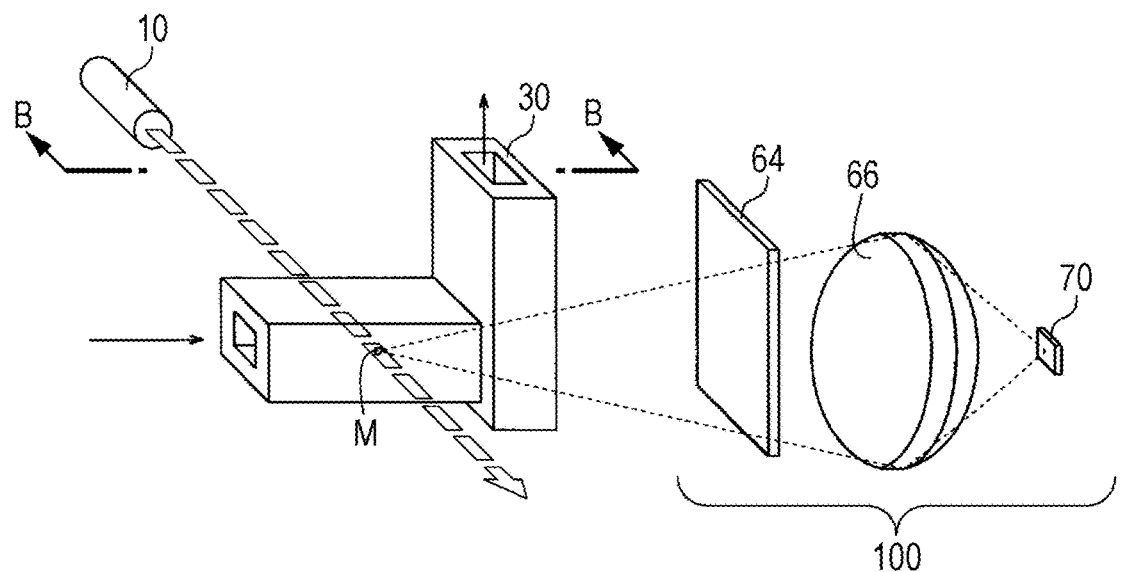
FIGS. 11A and 11B illustrate a structure of a detection unit in a modification of the first embodiment.
Figure 11B:
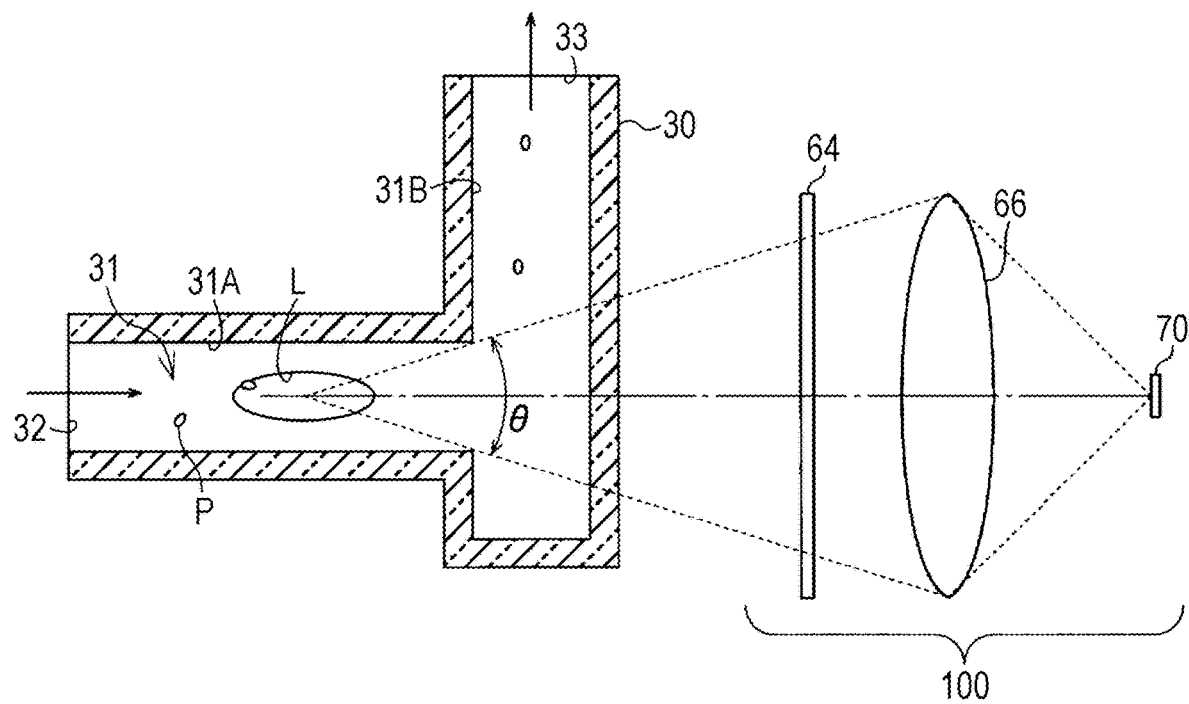

FIGS. 11A and 11B illustrate a simplified structure of the detection unit in the modification. FIG. 11A is a perspective view of the detection unit. FIG. 11B is a vertical cross-sectional view (cross-sectional view taken along line B-B illustrated in FIG. 11A) of the detection unit viewed from a front side. In FIGS. 11A and 11B, illustration of a part of the structure is omitted and only a minimum structure necessary for understanding a positional relationship is illustrated.

In the modification, the flow cell 30 has an L-shape, and has a bent flow passage 31 therein. The flow passage 31 includes a first flow passage 31A extending from an inflow port 32 into which the sample fluid flows, and a second flow passage 31B. The second flow passage 31B extends from a discharge port 33 through which the sample fluid is discharged in a direction perpendicular to the first flow passage 31A, and is connected to an end of the first flow passage 31A, while extending to a position just beyond the end of the first flow passage 31A. The light receiver 100 is provided at a position on an extension of the first flow passage 31A. The irradiation light having a predetermined wavelength and having a certain width is emitted from the light emitter 10 in a direction in which the first flow passage 31A extends. When the irradiation light enters the first flow passage 31A, an irradiation region L and a detection region M are formed at predetermined positions in the first flow passage 31A. An entering position of the irradiation light is designed so that a center of the detection region M is located on a light receiving axis of the light receiver 100.

Since the flow cell 30 has the above shape, the light can be received with high accuracy by making the most of a light collection angle θ of the light receiving lens 66. Further, by widening the irradiation range of the irradiation light to increase irradiation capacity, it is possible to secure the irradiation time of the deep ultraviolet rays to the particles P flowing in the first flow passage 31A. Therefore, it is possible to attenuate the autofluorescence derived from tryptophan and tyrosine in the microbial particles. Then, by providing the light receiver 100 at a position on the extension of the first flow passage 31A, the light receiver 100 can receive the light generated from the particles P passing through the detection region M at a position in front of the flow of the sample fluid (from a front side of the flow). Then, the light receiver 100 outputs a signal having a magnitude corresponding to the intensity of the received fluorescence, and the signal processor 230 obtains the signal output from the light receiver 100.

In the modification, the light reception and the measurement are performed while the sample fluid flows at a low speed without stopping the flow of the sample fluid. At this time, even if the particles P are moving, the particles P appear to be stationary from the fluorescence receiving element 70. Therefore, although the measurement time is shorter than in a case where the flow of the sample fluid is stopped, a certain amount of time enough for measurement can be given to the measurement of the signal waveform based on an individual particle P. Then, it is possible to count the number of microbial particles based on whether there is the time period in which the slope of the signal waveform is smaller than the predetermined value.

FIG. 12 is a flowchart illustrating a procedure example of the data analysis process in the modification.

This data analysis process is the same as the process in the above-described first embodiment (FIG. 5) until the analyzer 240 calculates the slope of the waveform of the signal obtained by the signal processor 230 (Step S200), and derives the time period Δt in which the slope is smaller than the predetermined value (Step S210). In the modification, after performing these procedures, the analyzer 240 checks whether there is the time period Δt in which the slope is smaller than the predetermined value. When there is the time period Δt, the analyzer 240 counts the particles P whose fluorescence has been received as the microbial particles (Step S220).

In the modification, the analyzer 240 may count the particles P whose fluorescence has been received as the microbial particles when the slope of the signal waveform is smaller than the predetermined value without deriving the time period Δt.

Structure of Microbial Particle Measuring Apparatus: Second Embodiment

Figure 13:
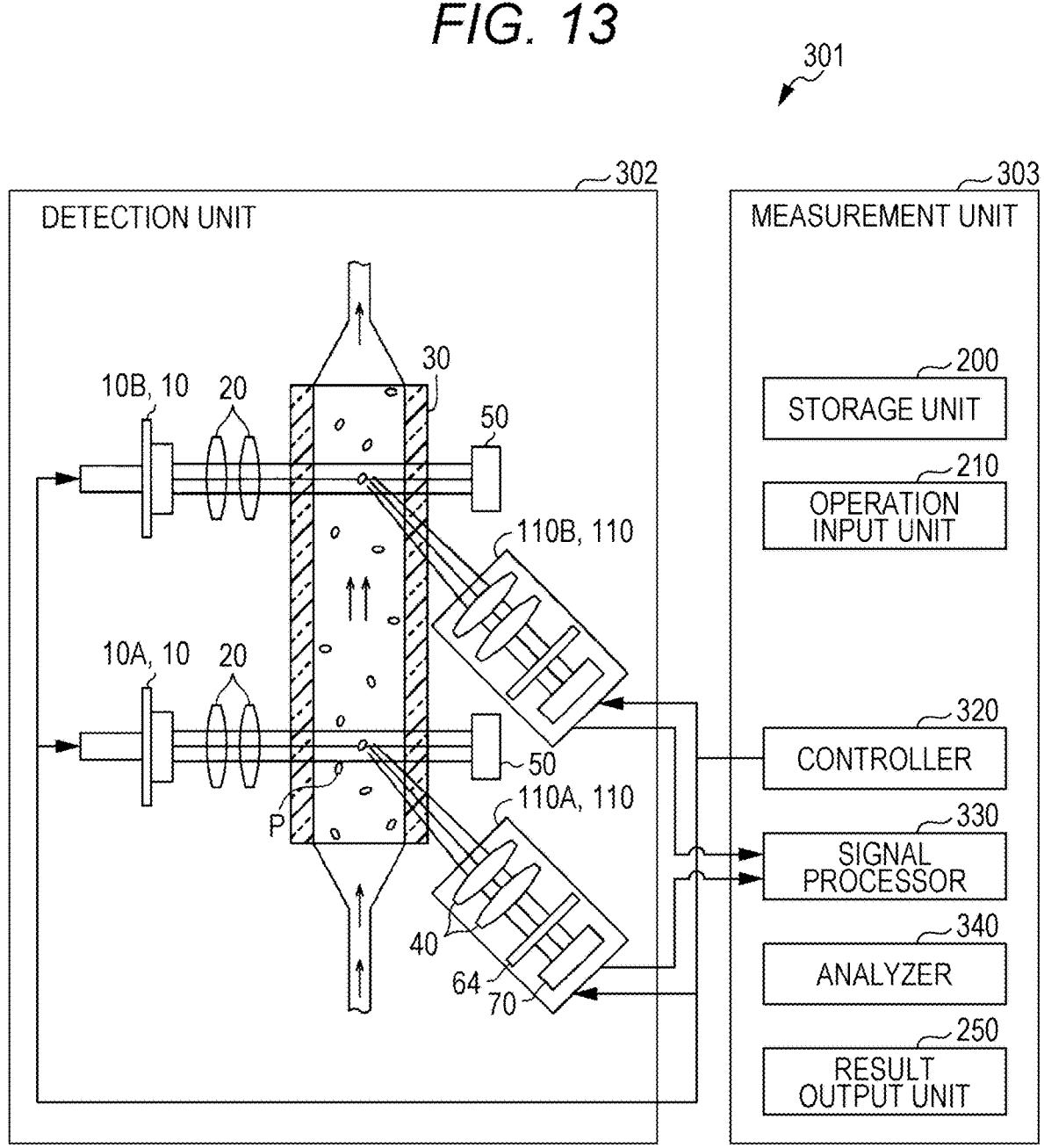
FIG. 13 is a schematic structure diagram of a microbial particle measuring apparatus according to a second embodiment.

FIG. 13 is a diagram schematically illustrating a structure of a microbial particle measuring apparatus 301 according to a second embodiment. In order to facilitate understanding of the technique according to the second embodiment, illustration of a part of the structure is omitted in FIG. 13. In the second embodiment, the microbial particles contained in the sample fluid are detected in particle units, and the number of microbial particles is counted. Description of portions common to the structure of the microbial particle measuring apparatus 1 according to the first embodiment illustrated in FIG. 1 will be omitted.

As illustrated in FIG. 13, the microbial particle measuring apparatus 301 mainly includes a detection unit 302 and a measurement unit 303. The detection unit 302 is greatly different from the above-described detection unit 2 in the microbial particle measuring apparatus 1 in that the detection unit 302 includes two pairs of light emitter and light receiver, and the detection is performed in a state in which the sample fluid is flowing inside the flow cell 30 at a constant flow rate (without stopping the flow of the sample fluid).

A first pair of the two pairs of the light emitter and the light receiver is provided at a position sandwiching an upstream portion of the flow cell 30 (a lower portion of the flow cell 30 in FIG. 13). A second pair thereof is provided at a position sandwiching a downstream portion of the flow cell 30 (an upper portion of the flow cell 30 in FIG. 13). Further, the flow rate of the sample fluid flowing into the flow cell 30 is set such that tryptophan and tyrosine in the microbial particles, which have been irradiated with deep ultraviolet rays by a light emitter 10A on an upstream side, are sufficiently decomposed (for example, 10 mL/min). The flow rate of the sample fluid and the irradiation of the irradiation light are controlled by a controller 320 (specifically, the fluid controller and the irradiation controller included in the controller 320). A further light emitter 10 may be provided at a position between the light emitter 10A on the upstream side and the light emitter 10B on the downstream side. Thus, the decomposition of tryptophan and tyrosine in the microbial particles can be promoted more effectively while the microbial particles that have passed through a first detection region formed by the first pair pass through a second detection region formed by the second pair. Therefore, it is possible to more effectively attenuate the autofluorescence.

A light shield 50 for blocking the irradiation light passing through the flow cell 30 is provided at a position opposite to the light emitter 10 via the flow cell 30, that is, a position at the front position in the optical axis of the irradiation light. The light shield 50 is, for example, a beam damper or a beam trap. In the present embodiment, the sample fluid is constantly flowing. Therefore, the discharge valve is not provided at the end of the pipe connected to the downstream portion of the flow cell 30.

Both the two light receivers 110 (110A, 110B) are provided at positions lateral to the optical axis of the irradiation light. The fluorescence emitted from the particle P passing through the detection region (first detection region) on the upstream side, that is, the particle P immediately after being irradiated with deep ultraviolet rays is received by a first light receiver 110A on the upstream side. Further, the fluorescence emitted from the particle P passing through the detection region (second detection region) on the downstream side, that is, the particle P, after a lapse of time after being irradiated with deep ultraviolet rays, is received by a second light receiver 110B on the downstream side. Then, the electric signals output from the two light receivers 110A and 110B are both processed by the signal processor 230.

By the way, unlike the light receiver 100 in the microbial particle measuring apparatus 1, the light receiver 110 may have a light receiving lens 40 on the front side or the back side of the optical filter 64. A structure of the light receiver 110 will be described below in detail with reference to the following drawing.

As described above, the structure of the detection unit 302 is different from that of the detection unit 2 in the microbial particle measuring apparatus 1. Accordingly, a structure in the measurement unit 303 is also different from that of the measurement unit 3 in the microbial particle measuring apparatus 1. Specifically, in the structure of the measurement unit 303, a control unit 320, a signal processor 330, and an analyzer 340 are respectively different from the control unit 220, the signal processor 230, and the analyzer 240 in the measurement unit 3.

The controller 320 controls the emission of the irradiation light by the light emitter 10, the flow rate of the sample fluid, and the light reception by the light receiver 110. The signal processor 330 processes two systems of electric signals output from the two light receivers 110. The analyzer 340 sorts and counts the particles P into the microbial particles and the non-microbial particles in particle units based on the processed two systems of electric signals. The specific contents of process performed by the analyzer 340 will be described below in detail with reference to another drawing.

Figure 14A:
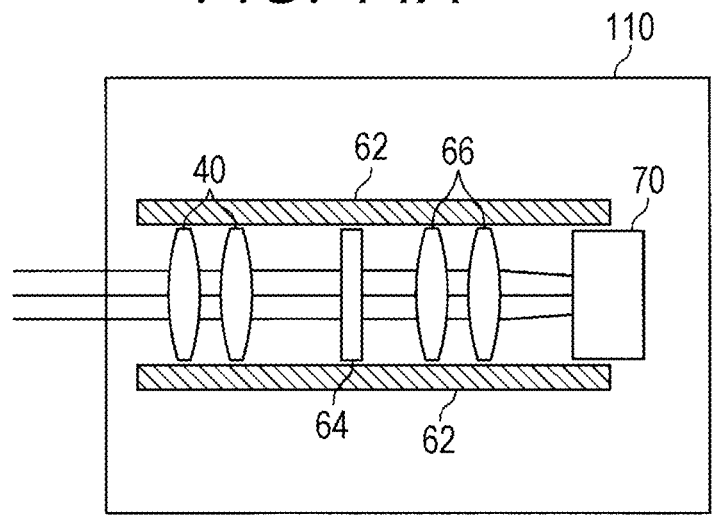
FIGS. 14A and 14B illustrate a structure of a light receiver in the second embodiment.
Figure 14B:
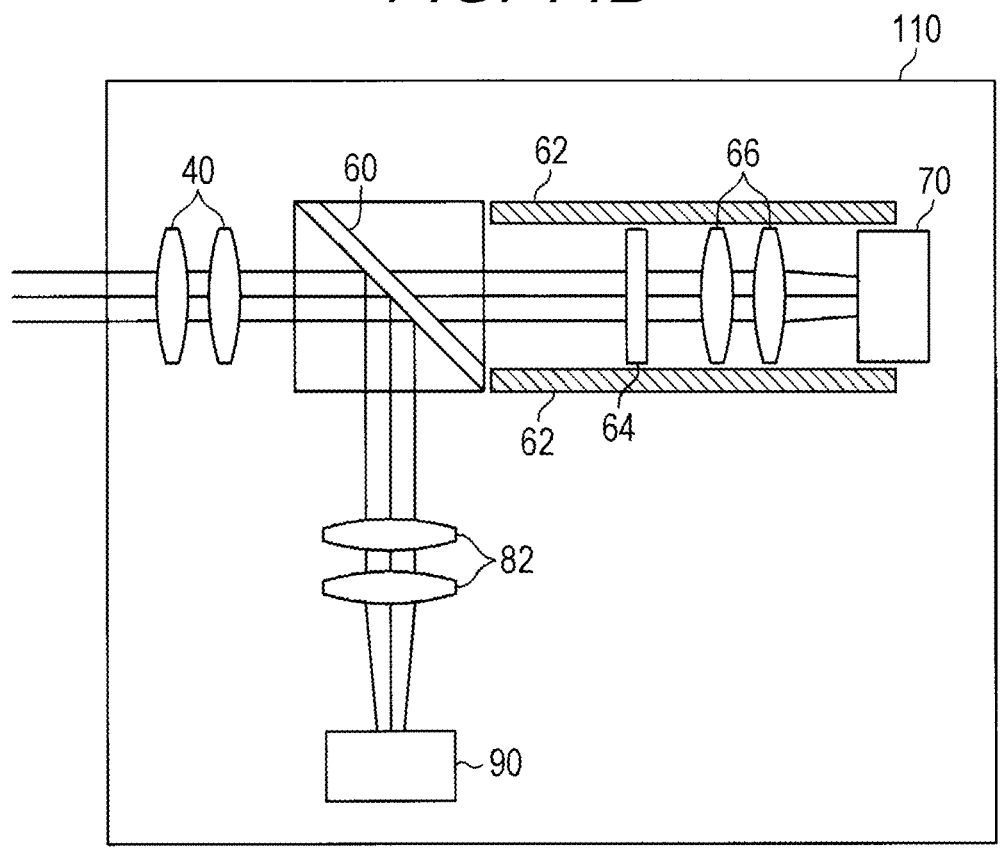

FIGS. 14A and 14B illustrate the structure of the light receiver 110 in the second embodiment. FIG. 14A illustrates a structure that enables cost reduction of the microbial particle measuring apparatus. FIG. 14B illustrates a structure that enables more accurate detection of the microbial particles. A structure illustrated in FIG. 14A is simplified by removing a part of a structure illustrated in FIG. 14B. Therefore, here, the structure illustrated in FIG. 14B will be described in detail. Description of portions common to the structure of the light receiver 100 in the first embodiment illustrated in FIG. 2 will be omitted.

The light receiving lens 40 is disposed at a position where light enters the light receiver 110. The light that has entered the light receiver 110 is condensed by the light receiving lens 40 and enters an optical mirror 60. The optical mirror 60 is, for example, a dichroic mirror. The optical mirror 60 reflects light having less than a predetermined cutoff wavelength (for example, 300 nm), while transmitting light having a predetermined cutoff wavelength or more. The scattered light emitted from the particles P has the same wavelength as the irradiation light. Therefore, by disposing such an optical mirror 60, it is possible to reflect the scattered light emitted from the particles P and simultaneously transmit other light including the fluorescence emitted from the particles P.

An optical filter 64 is disposed on the optical path of the light that has been transmitted through the optical mirror 60. The optical filter 64 is the same as that of the first embodiment. The optical filter 64 can cut the Raman scattered light while transmitting the fluorescence in the transmission wavelength band of the optical filter 64. The light that has been transmitted through the optical filter 64, that is, the fluorescence is condensed by the light receiving lens 66 and enters the fluorescence receiving element 70. The fluorescence receiving element 70 is the same as that of the first embodiment. The electric signal output from the fluorescence receiving element 70 is input to the signal processor 330 of the measurement unit 303. The optical path from a transmission side of the optical mirror 60 to the fluorescence receiving element 70 is covered with the light shielding wall 62.

On the other hand, a light receiving lens 82 is disposed on the optical path of the light reflected by the optical mirror 60, that is, the scattered light. The scattered light is condensed by the light-receiving lens 82 and enters the scattered light receiving element 90. The scattered light receiving element 90 is, for example, the photodiode (PD, semiconductor optical element) or the photomultiplier tube (PMT). The scattered light receiving element 90 outputs the electric signal according to the voltage value having the magnitude corresponding to the intensity (light amount) of the received light. The electric signal output from the scattered light receiving element 90 is input to the signal processor 330 of the measurement unit 303. The light shielding wall may also be provided on the optical path from a reflection side of the optical mirror 60 to the scattered light receiving element 90, similarly to the optical path from the transmission side of the optical mirror 60 to the fluorescence receiving element 70.

As described above, the fluorescence and the scattered light emitted from the particles P are received by the light receiver 110, and the electric signals output in response to the lights are input to the signal processor 330 and amplified, and then converted into the digital signal. Therefore, in the following description, the digital signal corresponding to the electric signal output from the fluorescence receiving element 70 of the light receiver 110 is referred to as a "fluorescence receiving signal". A digital signal corresponding to the electric signal output from the scattered light receiving element 90 of the light receiver 110 is referred to as a "scattered light receiving signal".

In the structure illustrated in FIG. 14A obtained by simplifying the structure illustrated in FIG. 14B, the optical mirror 60, the light receiving lens 82, and the scattered light receiving element 90 are not provided. Therefore, when this structure is employed for the light receiver 110, the light entered to the light receiver 110 is condensed by the light receiving lens 40 and proceeds to the optical filter 64. The fluorescence in the transmission wavelength band that has transmitted the optical filter 64 is condensed by the light receiving lens 66 and enters the fluorescence receiving element 70. In the light receiver 110, the light shielding wall 62 covers an entire optical path until the entering light reaches the fluorescence receiving element 70.

Data Analysis Process: Second Embodiment

FIG. 15 is a flowchart illustrating a procedure example of the data analysis process in the second embodiment. The data analysis process is the process performed by the analyzer 340 of the measurement unit 303. The data analysis process can be applied to any case where the light receiver 110 has one of two types of structures illustrated in FIGS. 14A and 14B.

First, the process performed by the analyzer 340 when the light receiver 110 has the simplified structure illustrated in FIG. 14A will be described along with the procedure example.

Step S300: The analyzer 340 counts the number of particles (the number of first fluorescent particles), that have passed through the first detection region and emit the fluorescence, based on the fluorescence receiving signal obtained by processing the electric signal output from the first light receiver 110A by the signal processor 330. More specifically, the analyzer 340 counts the number of first fluorescent particles by adding 1 to the number of first fluorescent particles when a peak value (voltage value) of the fluorescence receiving signal exceeds a threshold value. The number of first fluorescent particles is considered as a total number of particles that emit fluorescence before being irradiated with deep ultraviolet rays (immediately after being irradiated with deep ultraviolet rays), that is, before the attenuation of the fluorescence intensity.

Step S310: The analyzer 340 counts the number of particles (the number of second fluorescent particles), that have passed through the second detection region and emit the fluorescence, based on the fluorescence receiving signal obtained by processing the electric signal output from the second light receiver 110B by the signal processor 330. More specifically, the analyzer 340 counts the number of second fluorescent particles by adding 1 to the number of second fluorescent particles when the peak value (voltage value) of the fluorescence receiving signal exceeds the threshold value. The number of second fluorescent particles is considered as the total number of particles that emit fluorescence after being irradiated with deep ultraviolet rays and after tryptophan and tyrosine in the microbial particles are sufficiently decomposed, that is, the total number of non-microbial particles.

Step S320: The analyzer 340 counts the number of microbial particles by obtaining a difference between the number of first fluorescent particles counted in Step S300 described above and the number of second fluorescent particles counted in Step S310 described above. The analyzer 340 may determine the concentration of microbial particles by calculating the number of microbial particles per unit solution based on the counted number of microbial particles.

Next, the process performed by the analyzer 340 when the light receiver 110 has the structure illustrated in FIG. 14B will be described along with the procedure example.

Step S300: The analyzer 340 counts the number of particles (the number of first fluorescent particles), that have passed through the first detection region and emit the fluorescence, based on the fluorescence receiving signal and the scattered light receiving signal obtained by processing the electric signal output from the first light receiver 110A by the signal processor 330. More specifically, the analyzer 340 counts the number of first fluorescent particles by adding 1 to the number of first fluorescent particles, when the peak value of the fluorescence receiving signal exceeds the threshold value set for the fluorescence, and the peak value of the scattered light receiving signal synchronized with the fluorescence receiving signal exceeds the threshold value set for the scattered light. The number of first fluorescent particles here is considered as the total number of particles that have a predetermined particle size or more and emit fluorescence, before being irradiated with deep ultraviolet rays (immediately after being irradiated with deep ultraviolet rays), that is, before the attenuation of the fluorescence intensity.

Step S310: The analyzer 340 counts the number of particles (the number of second fluorescent particles), that have passed through the second detection region and emit the fluorescence, based on the fluorescence receiving signal and the scattered light receiving signal obtained by processing the electric signal output from the second light receiver 110B by the signal processor 330. More specifically, the analyzer 340 counts the number of second fluorescent particles by adding 1 to the number of second fluorescent particles, when the peak value of the fluorescence receiving signal exceeds the threshold value set for the fluorescence, and the peak value of the scattered light receiving signal synchronized with the fluorescence receiving signal exceeds the threshold value set for the scattered light. The number of second fluorescent particles here is considered as the number of particles that have a predetermined particle size or more and emit fluorescence after being irradiated with deep ultraviolet rays and after tryptophan and tyrosine in the microbial particles are sufficiently decomposed, that is, the number of non-microbial particles having the predetermined particle size or more.

Step S320: The analyzer 340 counts the number of microbial particles by obtaining the difference between the number of first fluorescent particles counted in Step S300 described above and the number of second fluorescent particles counted in Step S310 described above. The analyzer 340 may determine the concentration of microbial particles by calculating the number of microbial particles per unit solution based on the counted number of microbial particles.

Figure 16A:
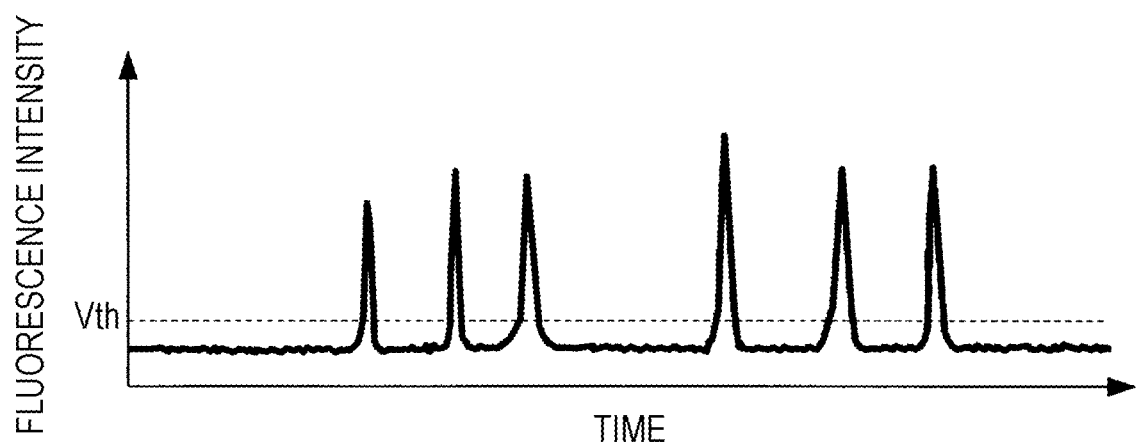
FIGS. 16A and 16B compare and illustrate examples of distribution of fluorescence receiving signals corresponding to fluorescence received by two light receivers in the second embodiment.
Figure 16B:
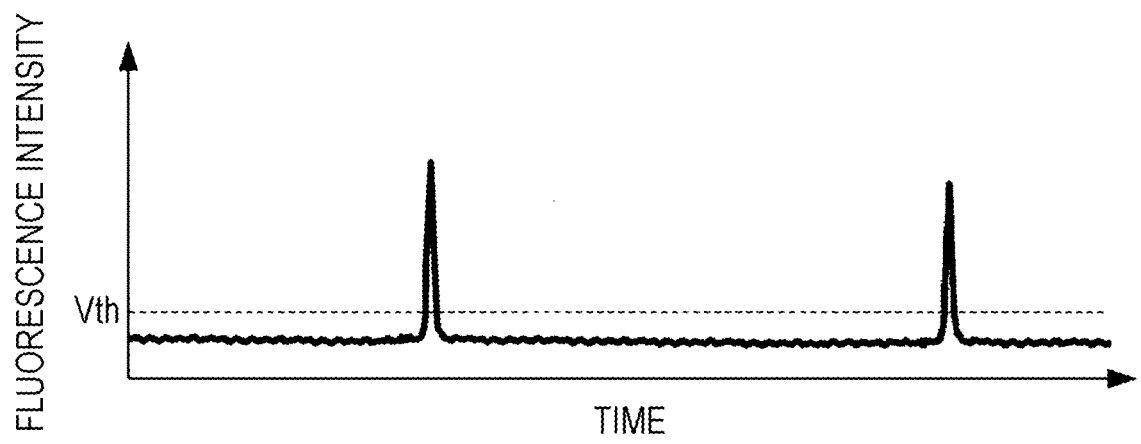

FIGS. 16A and 16B compare and illustrate examples of distribution of the fluorescence receiving signals corresponding to the fluorescence received by the two light receivers 110 in the second embodiment.

FIG. 16A illustrates an example of distribution of the fluorescence receiving signal from the first light receiver 110A. The fluorescence received by the first light receiver 110A is derived from the particles that emit the fluorescence before being irradiated with deep ultraviolet rays (immediately after being irradiated with deep ultraviolet rays), that is, the microbial particles and the non-microbial particles. At this point, tryptophan and tyrosine in the microbial particles have not yet been decomposed. Therefore, the number of times (the number of particles) the peak value (voltage value) of the signal exceeds a threshold value Vth is large.

FIG. 16B illustrates an example of distribution of the fluorescence receiving signal from the second light receiver 110B. The fluorescence received by the second light receiver 110B is derived from the particles that emit the fluorescence after being irradiated with deep ultraviolet rays and after tryptophan and tyrosine in the microbial particles are sufficiently decomposed, that is, the non-microbial particles. At a time of passing through the second detection region, the autofluorescence derived from tryptophan and tyrosine in the microbial particles disappears or is largely attenuated. Therefore, the peak value (voltage value) of the signal exceeding the threshold value Vth is due to the fluorescence derived from the non-microbial particles, and the number of times (the number of particles) is remarkably reduced compared with a case illustrated in FIG. 16A.

Advantages of Second Embodiment

As described above, the microbial particle measuring apparatus 301 of the second embodiment detects the microbial particles contained in the sample fluid in particle units and determines the concentration of the microbial particles. According to the second embodiment, the following effects can be obtained.

(1) The particles contained in the sample fluid are detected in particle units, not as the particle group. Thus, it is possible to accurately count the number of particles having tryptophan and tyrosine, that is, the number of microbial particles. Therefore, the concentration of the microbial particles can be accurately determined based on a counting result.

(2) The deep ultraviolet rays are irradiated while the sample fluid flows. Therefore, a total amount of the deep ultraviolet rays received by the sample fluid is smaller than that in the first embodiment. Thus, it is possible to suppress the attenuation of the fluorescence intensity derived from the non-microbial particles contained in the sample fluid. Therefore, while avoiding the influence of the non-microbial particles as much as possible, it is possible to accurately count the number of microbial particles and consequently accurately determine the concentration of the microbial particles based on the counting result.

(3) In a fluid that has been subjected to the sterilization treatment (for example, ultraviolet sterilization) such that tryptophan and tyrosine in the microbial particles are decomposed, the autofluorescence has already been attenuated by the sterilization treatment. Thus, when the measurement is performed on such a fluid, the microbial particles may not be counted. Therefore, it is possible to check a bactericidal effect on the microbial particles considered to have been contained in the fluid before the sterilization treatment.

(4) In a typical microbial particle measuring apparatus, the light emitter generally includes a semiconductor laser diode because of straightness of the emitted light, easiness of focusing a light beam, easiness of increasing light intensity per unit area, or the like. However, the semiconductor laser diode is very expensive. Further, it is difficult to manufacture the semiconductor laser diode corresponding to the wavelength range of deep ultraviolet rays. Therefore, it is more expensive to form the light emitter with the semiconductor laser diode. In contrast, in the embodiments of the present disclosure, the light emitter 10 includes the LED. Thus, the manufacturing cost required for the light emitter 10 can be significantly reduced as compared with the typical structure. Therefore, the microbial particle measuring apparatus can be manufactured at a very low cost.

Modification of Second Embodiment

The microbial particle measuring apparatus 301 is not limited to the above-described structure and can be implemented with various modifications.

For example, the microbial particle measuring apparatus 301 may be provided with only one pair of the light emitter and the light receiver. In this case, the particles that emit the fluorescence before irradiation (immediately after irradiation) with deep ultraviolet rays may be considered as the microbial particles, to count the particles.

With such a structure, it is difficult to grasp a change in the number of particles that emit the fluorescence before and after irradiation with deep ultraviolet rays. Therefore, the non-microbial particles that emit the fluorescence are also counted as the microbial particles. From this, in this structure, compared to the structure of the microbial particle measuring apparatus 301 described above, false positives are high, and performance of separating the microbial particles from the non-microbial particles (and thus the determination accuracy of the concentration of the microbial particles) is inferior. However, according to this structure, it is possible to realize a measuring apparatus capable of counting the approximate number of microbial particles with a very simple structure. Therefore, the microbial particle measuring apparatus can be downsized and manufactured at a very low cost.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A microbial particle measuring apparatus comprising:
  a light emitter configured to irradiate a fluid with light of a predetermined wavelength over a predetermined measurement time;
  a fluorescence receiver configured to selectively receive fluorescence emitted from particles contained in the fluid and output a signal having a magnitude corresponding to intensity of the fluorescence;
  a signal acquisition unit configured to obtain the signal output from the fluorescence receiver at regular intervals over the measurement time; and
  a determiner configured to calculate a slope of waveform of the signal obtained by the signal acquisition unit, and determine a concentration of microbial particles contained in the fluid using an attenuation amount of fluorescence intensity generated in a time period in which the slope in the measurement time is smaller than a predetermined value as an amount of attenuation derived from the microbial particles.

2. The microbial particle measuring apparatus according to claim 1, wherein the determiner determines the concentration of the microbial particles from the attenuation amount of the fluorescence intensity in the time period based on a predetermined relational expression indicating a relationship between the attenuation amount of the fluorescence intensity and the concentration of the microbial particles.

3. The microbial particle measuring apparatus according to claim 1, further comprising a fluid controller configured to control flow of the fluid, and stop inflow and discharge of the fluid over the predetermined measurement time.

4. The microbial particle measuring apparatus according to claim 1, wherein the fluorescence receiver has a filter for transmitting light in a predetermined wavelength range that is emitted from the particles, reduces light other than the fluorescence emitted from the particles by the filter, and selectively receives the fluorescence in the wavelength range.

5. The microbial particle measuring apparatus according to claim 4, wherein
  the light emitter emits light of a predetermined wavelength in an absorption wavelength range of tryptophan and tyrosine, and
  the fluorescence receiver transmits, through the filter, light in a wavelength range longer than a wavelength of Raman scattered light that is generated when the fluid is a liquid, and selectively receives the fluorescence emitted from the particles.

6. A microbial particle measuring apparatus comprising:
  a light emitter configured to irradiate a fluid with light of a predetermined wavelength;
  a fluorescence receiver configured to selectively receive fluorescence emitted from particles contained in the fluid and outputs a signal having a magnitude corresponding to intensity of the fluorescence;
  a signal acquisition unit configured to obtain the signal output from the fluorescence receiver; and
  a counter configured to calculate a slope of waveform of the signal obtained by the signal acquisition unit, and count the particles as microbial particles when there is a time period in which the slope is smaller than a predetermined value, or when the slope is smaller than the predetermined value.

7. The microbial particle measuring apparatus according to claim 6, wherein the fluorescence receiver has a filter for transmitting light in a predetermined wavelength range that is emitted from the particles, reduces light other than the fluorescence emitted from the particles by the filter, and selectively receives the fluorescence in the wavelength range.

8. The microbial particle measuring apparatus according to claim 7, wherein
  the light emitter emits light of a predetermined wavelength in an absorption wavelength range of tryptophan and tyrosine, and
  the fluorescence receiver transmits, through the filter, light in a wavelength range longer than a wavelength of Raman scattered light that is generated when the fluid is a liquid, and selectively receives the fluorescence emitted from the particles.

9. A microbial particle measuring method comprising:
  selectively receiving fluorescence emitted from particles contained in a fluid while irradiating the fluid with light of a predetermined wavelength over a predetermined measurement time, and obtaining a signal output with a magnitude corresponding to intensity of the fluorescence at regular intervals; and
  calculating a slope of waveform of the signal obtained, and determining a concentration of microbial particles contained in the fluid using an attenuation amount of fluorescence intensity generated in a time period in which the slope in the measurement time is smaller than a predetermined value as an amount of attenuation derived from the microbial particles.

10. The microbial particle measuring method according to claim 9, wherein the calculating a slope and determining a concentration comprises determining the concentration of the microbial particles from the attenuation amount of the fluorescence intensity in the time period based on a predetermined relational expression indicating a relationship between the attenuation amount of the fluorescence intensity and the concentration of the microbial particles.

11. The microbial particle measuring method according to claim 9, wherein the receiving fluorescence and obtaining a signal comprises stopping inflow and discharge of the fluid over the predetermined measurement time in the process of the receiving fluorescence and obtaining a signal.

* * * * *